US012354559B2

(12) United States Patent
Feng et al.

(10) Patent No.: US 12,354,559 B2
(45) Date of Patent: Jul. 8, 2025

(54) SHIFT REGISTER, GATE DRIVE CIRCUIT AND DISPLAY DEVICE

(71) Applicants: Hefei BOE Joint Technology Co., Ltd., Anhui (CN); BOE Technology Group Co., Ltd., Beijing (CN)

(72) Inventors: Xuehuan Feng, Beijing (CN); Yongqian Li, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/685,922

(22) PCT Filed: Oct. 31, 2022

(86) PCT No.: PCT/CN2022/128664
§ 371 (c)(1),
(2) Date: Feb. 23, 2024

(87) PCT Pub. No.: WO2024/092416
PCT Pub. Date: May 10, 2024

(65) Prior Publication Data
US 2025/0182698 A1 Jun. 5, 2025

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2300/0804* (2013.01);
(Continued)

(58) Field of Classification Search
CPC .......... G09G 3/20; G09G 3/3233; G09G 3/32; G09G 3/36; G09G 3/3208; G09G 3/3648;
(Continued)

(56) References Cited

U.S. PATENT DOCUMENTS

2021/0166603 A1* 6/2021 Feng ...................... G11C 19/28
2021/0166633 A1* 6/2021 Feng .................... G09G 3/3266
(Continued)

FOREIGN PATENT DOCUMENTS

CN 109147704 A 1/2019
CN 113270071 A 8/2021
(Continued)

OTHER PUBLICATIONS

International Search Report for PCT/CN2022/128664 Mailed Jun. 10, 2023.

*Primary Examiner* — Dong Hui Liang
(74) *Attorney, Agent, or Firm* — Ling Wu; Stephen Yang; Ling and Yang Intellectual Property

(57) ABSTRACT

Embodiments of the present disclosure provide a shift register, a gate drive circuit and a display device. The shift register includes a light emitting drive output module configured to supply a first voltage of a first power supply terminal to a light emitting control drive signal output terminal in response to control of a voltage at a third node, to supply a second voltage of a second power supply terminal to the light emitting control drive signal output terminal in response to control of a voltage at a second node, and to supply a second voltage of a second power supply terminal to the light emitting control drive signal output terminal in response to control of the second voltage at the second power supply terminal.

18 Claims, 17 Drawing Sheets

(52) U.S. Cl.
CPC ............... *G09G 2300/0842* (2013.01); *G09G 2300/0861* (2013.01); *G09G 2310/0286* (2013.01); *G09G 2310/061* (2013.01); *G09G 2310/08* (2013.01); *G09G 2320/0626* (2013.01)

(58) Field of Classification Search
CPC .. G09G 3/3688; G09G 3/2007; G09G 3/2011; G09G 3/2003; G09G 3/344; G09G 3/006; G09G 3/3607; G09G 2320/0233; G09G 2320/0276; G09G 2320/0271; G09G 2320/0673; G09G 2320/0626; G09G 2320/0285; G09G 2320/0242; G09G 2310/027; G09G 2310/08; G09G 2360/16; G09G 2330/021; G09G 2300/0842; G09G 2300/0819; G09G 2300/0861
See application file for complete search history.

(56) References Cited

U.S. PATENT DOCUMENTS

| | | | | |
|---|---|---|---|---|
| 2021/0225262 | A1* | 7/2021 | Liu ...................... | G09G 3/2022 |
| 2023/0306924 | A1* | 9/2023 | Feng ...................... | G11C 19/28 |

FOREIGN PATENT DOCUMENTS

| | | | |
|---|---|---|---|
| CN | 113763886 | A | 12/2021 |
| CN | 113793570 | A | 12/2021 |
| CN | 113891524 | A | 1/2022 |
| CN | 114299884 | A | 4/2022 |
| CN | 114333706 | A | 4/2022 |

* cited by examiner

SHIFT REGISTER, GATE DRIVE CIRCUIT AND DISPLAY DEVICE

CROSS-REFERENCE TO RELATED APPLICATIONS

The present application is a U.S. National Phase Entry of International Application PCT/CN2022/128664 having an international filing date of Oct. 31, 2022, and the contents disclosed in the above-mentioned application are hereby incorporated as a part of this application.

TECHNICAL FIELD

The present disclosure relates to the field of display technologies, in particular to a shift register, a gate drive circuit and a display device.

BACKGROUND

The application of Active Matrix Organic Light Emitting Diode (AMOLED) panels is becoming increasingly widespread. A pixel display device of AMOLED is an Organic Light Emitting Diode (OLED for short). AMOLED can emit light by driving a thin film transistor to generate a driving current in a saturated state, which drives a light emitting device to emit light.

SUMMARY

Embodiments of the disclosure provide a shift register, a gate drive circuit and a display device, the specific scheme of which is as follows.

A shift register is according to an embodiment of the present disclosure, including:

a voltage regulating module that is connected with a preceding stage light emitting cascade signal output terminal, a first clock signal terminal, a second clock signal terminal, a first power supply terminal, a second power supply terminal, a first node and a second node, and the voltage regulating module is configured to adjust voltages at the first node and the second node in response to control of signals provided by the preceding stage light emitting cascade signal output terminal, the first clock signal terminal, the second clock signal terminal, the first power supply terminal and the second power supply terminal;

a light emitting cascade output module that is connected with the first power supply terminal, the second power supply terminal, a light emitting cascade signal output terminal, the first node, and the second node, and the light emitting cascade output module is configured to supply a first voltage of the first power supply terminal or a second voltage of the second power supply terminal to the light emitting cascade signal output terminal in response to control of the voltage at the first node and in response to control of the voltage at the second node;

a node control module that is connected with the first node, a subsequent stage gate cascade signal output terminal, the second power supply terminal, a third node, and the second clock signal terminal, and the node control module is configured to adjust a voltage at a third node in response to control of signals provided by the subsequent stage gate cascade signal output terminal, the first node, and the second clock signal terminal; and a light emitting drive output module that is connected to the second node and connected to the third node, the first power supply terminal, the second power supply terminal, and a light emitting control drive signal output terminal, and the light emitting drive output module is configured to supply the first voltage of the first power supply terminal to the light emitting control drive signal output terminal in response to the control of the voltage at the third node, to supply a second voltage of the second power supply terminal to the light emitting control drive signal output terminal in response to the control of the voltage at the second node, and to supply the second voltage of the second power supply terminal to the light emitting control drive signal output terminal in response to the control of the voltage at the second node;

or, a light emitting drive output module that is connected with the second node, the third node, the first power supply terminal, the second power supply terminal, the subsequent stage gate cascade signal output terminal and the light emitting control drive signal output terminal, and the light emitting drive output module is configured to supply the first voltage of the first power supply terminal to the light emitting control drive signal output terminal in response to control of the voltage at the third node, and to supply the second voltage of the second power supply terminal to the light emitting control drive signal output terminal in response to the control of the voltage at the second node and control of the subsequent stage gate cascade signal output terminal.

In one possible implementation, in a shift register according to an embodiment of the present disclosure, the node control module includes a first switching transistor, a second switching transistor, a third switching transistor, and a fourth switching transistor; wherein a gate of the first switching transistor is electrically connected with the subsequent stage gate cascade signal output terminal, a first pole of the first switching transistor is electrically connected with a first node, and a second pole of the first switching transistor is electrically connected with a third node;

a gate of the second switching transistor is electrically connected with the second clock signal terminal, a first pole of the second switching transistor is electrically connected with the second power supply terminal, and a second pole of the second switching transistor is electrically connected with a gate of the third switching transistor;

a first pole of the third switching transistor is electrically connected with the first power supply terminal, and a second pole of the third switching transistor is electrically connected with the third node;

a gate of the fourth switching transistor is electrically connected with the subsequent stage gate cascade signal output terminal, a first pole of the fourth switching transistor is electrically connected with the first power supply terminal, and a second pole of the fourth switching transistor is electrically connected with the second pole of the second switching transistor.

In one possible implementation, in a shift register according to an embodiment of the present disclosure, the light emitting drive output module includes a fifth switching transistor, a sixth switching transistor, and a seventh switching transistor; wherein a gate of the fifth switching transistor is electrically connected with the third node, a first pole of the fifth switching transistor is electrically connected with the first power supply terminal, and a second pole of the fifth switching transistor is electrically connected with the light emitting control drive signal output terminal;

a gate of the sixth switching transistor is electrically connected to the second node, a first pole of the sixth switching transistor is electrically connected with the second power supply terminal, and a second pole of the sixth switching transistor is electrically connected with the light emitting control drive signal output terminal;

a gate of the seventh switching transistor is electrically connected with the second pole of the second switching transistor, a first pole of the seventh switching transistor is electrically connected with the second power supply terminal, and a second pole of the seventh switching transistor is electrically connected with the light emitting control drive signal output terminal.

In one possible implementation, in a shift register according to an embodiment of the present disclosure, the light emitting cascade output module includes an eighth switching transistor, a first capacitor, a ninth switching transistor and a second capacitor; wherein a gate of the eighth switching transistor is electrically connected with the first node, a first pole of the eighth switching transistor is electrically connected with the first power supply terminal, and a second pole of the eighth switching transistor is electrically connected with the light emitting cascade signal output terminal;

a first terminal of the first capacitor is electrically connected between the first power supply terminal and the first pole of the eighth switching transistor, and a second terminal of the first capacitor is electrically connected with the gate of the eighth switching transistor;

a gate of the ninth switching transistor is electrically connected with the second node, a first pole of the ninth switching transistor is electrically connected with the second power supply terminal, and a second pole of the ninth switching transistor is electrically connected with the light emitting cascade signal output terminal;

a first terminal of the second capacitor is electrically connected with the second clock signal terminal, and a second terminal of the second capacitor is electrically connected with the second node.

In one possible implementation, in a shift register according to an embodiment of the present disclosure, the voltage regulating module includes:

a first input sub-module that is connected to the preceding stage light emitting cascade signal output terminal, the first clock signal terminal, and the second node, and the first input sub-module is configured to provide a signal from the preceding stage light emitting cascade signal output terminal to the second node in response to control of a signal of the first clock signal terminal;

a second input sub-module that is connected with the first clock signal terminal, the second power supply terminal, the second node, and a fourth node, and the second input sub-module is configured to supply the second voltage of the second power supply terminal to the fourth node in response to control of a signal at the first clock signal terminal, and to provide the signal of the first clock signal terminal to the fourth node in response to control of the voltage at the second node;

a first voltage control sub-module that is connected to the first node, the second node, the fourth node, the second clock signal terminal, and the first power supply terminal, and the first voltage control sub-module is configured to provide a signal of the second clock signal terminal to the first node in response to control of a voltage at the fourth node and the signal of the second clock signal terminal, and to provide a first voltage of the first power supply terminal to the first node in response to control of the voltage at the second node; and a second voltage control sub-module that is connected to the second node, the fourth node, the second clock signal terminal, and the first power supply terminal, and the second voltage control sub-module is configured to supply the first voltage of the first power supply terminal to the second node in response to the control of the voltage at the fourth node and the signal at the second clock signal terminal.

In one possible implementation, in a shift register according to an embodiment of the present disclosure, the first input sub-module includes a tenth switching transistor, a gate of the tenth switching transistor is electrically connected to the first clock signal terminal, a first pole of the tenth switching transistor is electrically connected to the preceding stage light emitting cascade signal output terminal, and a second pole of the tenth switching transistor is electrically connected to the second node;

the second input sub-module includes an eleventh switching transistor and a twelfth switching transistor; wherein, a gate of the eleventh switching transistor is electrically connected with the first clock signal terminal, a first pole of the eleventh switching transistor is electrically connected with the second power supply terminal, and a second pole of the eleventh switching transistor is electrically connected with the fourth node; a gate of the twelfth switching transistor is electrically connected with the second node, a first pole of the twelfth switching transistor is electrically connected with the first clock signal terminal, and a second pole of the twelfth switching transistor is electrically connected with the fourth node;

the first voltage control sub-module includes a thirteenth switching transistor, a fourteenth switching transistor, a fifteenth switching transistor and a third capacitor; wherein, a gate of the thirteenth switching transistor is electrically connected with the fourth node, a first pole of the thirteenth switching transistor is electrically connected with the second clock signal terminal, a second pole of the thirteenth switching transistor is electrically connected with the first pole of the fourteenth switching transistor, a gate of the fourteenth switching transistor is electrically connected with the second clock signal terminal, and a second pole of the fourteenth switching transistor is electrically connected with the first node; a gate of the fifteenth switching transistor is electrically connected with the second node, a first pole of the fifteenth switching transistor is electrically connected with the first power supply terminal, and a second pole of the fifteenth switching transistor is electrically connected with the first node; a first terminal of the third capacitor is electrically connected with the fourth node, and a second terminal of the third capacitor is electrically connected with the second pole of the thirteenth switching transistor;

the second voltage control sub-module includes a sixteenth switching transistor and a seventeenth switching transistor; a gate of the sixteenth switching transistor is electrically connected with the fourth node, a first pole of the sixteenth switching transistor is electrically connected with the first power supply terminal, a second pole of the sixteenth switching transistor is electrically connected with a first pole of the seventeenth switching transistor, a gate of the seventeenth switching transistor is electrically connected with the second clock signal terminal, and a second pole of the seventeenth switching transistor is electrically connected with the second node.

In one possible implementation, in a shift register according to an embodiment of the present disclosure, all of the first to seventeenth switching transistors are P-type transistors.

In one possible implementation, in a shift register according to an embodiment of the present disclosure, the node control module includes an eighteenth switching transistor, a nineteenth switching transistor, a twentieth switching transistor and a twenty-first switching transistor; wherein a gate of the eighteenth switching transistor is electrically connected with the subsequent stage gate cascade signal output terminal, a first pole of the eighteenth switching transistor is electrically connected with the second power supply terminal, and a second pole of the eighteenth switching transistor is electrically connected with a gate of the nineteenth switching transistor;

a first pole of the nineteenth switching transistor is electrically connected with the first node, and a second pole of the nineteenth switching transistor is electrically connected with the third node;

a gate of the twentieth switching transistor is electrically connected with the subsequent stage gate cascade signal output terminal, a first pole of the twentieth switching transistor is electrically connected with the second power supply terminal, and a second pole of the twentieth switching transistor is electrically connected with the third node;

both of a gate and a first pole of the twenty-first switching transistor are electrically connected with the second clock signal terminal, and a second pole of the twenty-first switching transistor is electrically connected with the second pole of the eighteenth switching transistor.

In one possible implementation, in a shift register according to an embodiment of the present disclosure, the light emitting drive output module includes a twenty-second switching transistor, a twenty-third switching transistor, a twenty-fourth switching transistor, a twenty-fifth switching transistor, and a twenty-sixth switching transistor; wherein a gate of the twenty-second switching transistor is electrically connected with the third node, a first pole of the twenty-second switching transistor is electrically connected with the second power supply terminal, and a second pole of the twenty-second switching transistor is electrically connected with a gate of the twenty-fifth switching transistor;

a gate of the twenty-third switching transistor is electrically connected with the second node, a first pole of the twenty-third switching transistor is electrically connected with the first power supply terminal, and a second pole of the twenty-third switching transistor is electrically connected to the gate of the twenty-fifth switching transistor;

a gate of the twenty-fourth switching transistor is electrically connected with the subsequent stage gate cascade signal output terminal, a first pole of the twenty-fourth switching transistor is electrically connected with the first power supply terminal, and a second pole of the twenty-fourth switching transistor is electrically connected with a gate of the twenty-fifth switching transistor;

a first pole of the twenty-fifth switching transistor is electrically connected with the second power supply terminal, and a second pole of the twenty-fifth switching transistor is electrically connected with the light emitting control drive signal output terminal;

both of a gate and a first pole of the twenty-sixth switching transistor is electrically connected with the first power supply terminal, a second pole of the twenty-sixth switching transistor is electrically connected with the light emitting control drive signal output terminal.

In one possible implementation, in a shift register according to an embodiment of the present disclosure, the light emitting cascade output module includes a twenty-seventh switching transistor, a twenty-eighth switching transistor, a twenty-ninth switching transistor, a fourth capacitor, a thirtieth switching transistor, and a fifth capacitor; wherein a gate of the twenty-seventh switching transistor is electrically connected with the first node, a first pole of the twenty-seventh switching transistor is electrically connected with the second power supply terminal, and a second pole of the twenty-seventh switching transistor is electrically connected with a first pole of the twenty-eighth switching transistor;

a gate of the twenty-eighth switching transistor is electrically connected with the first node, and a second pole of the twenty-eighth switching transistor is electrically connected with the light emitting cascade signal output terminal;

a gate of the twenty-ninth switching transistor is electrically connected with the light emitting cascade signal output terminal, a first pole of the twenty-ninth switching transistor is electrically connected with the first power supply terminal, and a second pole of the twenty-ninth switching transistor is electrically connected with the first pole of the twenty-eighth switching transistor;

a first terminal of the fourth capacitor is connected with the first node, and a second terminal of the fourth capacitor is connected with the second power supply terminal;

a gate of the thirtieth switching transistor is electrically connected with the second node, a first pole of the thirtieth switching transistor is electrically connected with the first power supply terminal, and a second pole of the thirtieth switching transistor is electrically connected to the light emitting cascade signal output terminal;

a first terminal of the fifth capacitor is electrically connected with the second node, and a second terminal of the fifth capacitor is electrically connected with the light emitting cascade signal output terminal.

In one possible implementation, in a shift register according to an embodiment of the present disclosure, the voltage regulating module includes:

a first input sub-module that is connected to the preceding stage light emitting cascade signal output terminal, the first clock signal terminal, and the fourth node, and the first input sub-module is configured to provide a signal from the preceding stage light emitting cascade signal output terminal to the fourth node in response to control of a signal of the first clock signal terminal;

a second input sub-module that is connected to the first clock signal terminal, the first power supply terminal, the fourth node and the fifth node, and the second input sub-module is configured to provide the first voltage of the first power supply terminal to the fifth node in response to the control of the signal of the first clock signal terminal, and to provide the signal of the first clock signal terminal to the fifth node in response to control of a voltage at the fourth node;

a first voltage control sub-module that is connected to the first node, the second node, the fourth node, the fifth node, the second clock signal terminal, the first power supply terminal and the second power supply terminal, and the first voltage control sub-module is configured to provide the signal of the second clock signal terminal to the first node in response to control of a voltage at the fifth node and the signal of the second clock signal terminal, to supply a voltage at the fourth node to the sixth node in response to control of the voltage at the fourth node and the first power supply terminal, to supply a voltage at the sixth node to the second node in response to control of the first power supply terminal, to provide the first voltage of the first power supply terminal to the sixth node in response to control of the voltage at the second node, and to provide the second voltage of the second power supply terminal to the first node in response to the control of the voltage at the second node; and a second voltage control sub-module that is connected to the fourth node, the fifth node, the second clock signal terminal and the second power supply terminal, and the second voltage control sub-module is configured to provide the second voltage of the second power supply terminal to the fourth node in response to control of a voltage at the fifth node and the signal of the second clock signal terminal.

In one possible implementation, in a shift register according to an embodiment of the present disclosure, the first input sub-module includes a thirty-first switching transistor, a gate of the thirty-first switching transistor is electrically connected to the first clock signal terminal, a first pole of the thirty-first switching transistor is electrically connected to the preceding stage light emitting cascade signal output terminal, and a second pole of the thirty-first switching transistor is electrically connected to the fourth node;

the second input sub-module includes a thirty-second switching transistor and a thirty-third switching transistor; wherein, a gate of the thirty-second switching transistor is electrically connected with the first clock signal terminal, a first pole of the thirty-second switching transistor is electrically connected with the first power supply terminal, and a second pole of the thirty-second switching transistor is electrically connected with the fifth node; a gate of the thirty-third switching transistor is electrically connected with the fourth node, a first pole of the thirty-third switching transistor is electrically connected with the first clock signal terminal, and a second pole of the thirty-third switching transistor is electrically connected with the fifth node;

the first voltage control sub-module includes a thirty-fourth switching transistor, a thirty-fifth switching transistor, a thirty-sixth switching transistor, a thirty-seventh switching transistor, a thirty-eighth switching transistor, a thirty-ninth switching transistor and a sixth capacitor; wherein a gate of the thirty-fourth switching transistor is electrically connected with the fifth node, a first pole of the thirty-fourth switching transistor is electrically connected with the second clock signal terminal, a second pole of the thirty-fourth switching transistor is electrically connected with the seventh node, a gate of the thirty-fifth switching transistor is electrically connected with the second clock signal terminal, a first pole of the thirty-fifth switching transistor is electrically connected with the seventh node, a the second pole of the thirty-fifth switching transistor is electrically connected with the first node; a gate of the thirty-sixth switching transistor is electrically connected with the second node, a first pole of the thirty-sixth switching transistor is electrically connected with the second power supply terminal, and a second pole of the thirty-sixth switching transistor is electrically connected with the first node; a gate of the thirty-seventh switching transistor is electrically connected with the second node, a first pole of the thirty-seventh switching transistor is electrically connected with the first power supply terminal, and a second pole of the thirty-seventh switching transistor is electrically connected with the sixth node; a gate of the thirty-eighth switching transistor is electrically connected with the first power supply terminal, a first pole of the thirty-eighth switching transistor is electrically connected with the fourth node, and a second pole of the thirty-eighth switching transistor is electrically connected with the sixth node; a gate of the thirty-ninth switching transistor is electrically connected with the first power supply terminal, a first pole of the thirty-ninth switching transistor is electrically connected with the sixth node, and a second pole of the thirty-ninth switching transistor is electrically connected with the second node; a first terminal of the sixth capacitor is electrically connected with the fifth node, and a second terminal of the sixth capacitor is electrically connected with the seventh node;

the second voltage control sub-module includes a fortieth switching transistor and a fortieth switching transistor; a gate of the fortieth switching transistor is electrically connected to the fifth node, a first pole of the fortieth switching transistor is electrically connected to the second power supply terminal, a second pole of the fortieth switching transistor is electrically connected to a first pole of the forty-first switching transistor, a gate of the forty-first switching transistor is electrically connected to the second clock signal terminal, and a second pole of the forty-first switching transistor is electrically connected to the fourth node.

In one possible implementation, in a shift register according to an embodiment of the present disclosure, a reset module is further included, the reset module is coupled to a reset signal terminal, the first power terminal and the fourth node, and the reset module is configured to provide the first voltage of the first power terminal to the fourth node in response to control of a signal of the reset signal terminal.

In one possible implementation, in a shift register according to an embodiment of the present disclosure, the reset module includes a forty-second switching transistor, a gate of the forty-second switching transistor electrically connected to the reset signal terminal, a first pole of the forty-second switching transistor electrically connected to the first power supply terminal, and a second pole of the forty-second switching transistor electrically connected to the fourth node.

In one possible implementation, in a shift register according to an embodiment of the present disclosure, all of the eighteenth to forty-second switching transistors are N-type transistors.

Correspondingly, a gate drive circuit is also provided according to an embodiment of the present disclosure, including a plurality of cascaded first shift registers, wherein the first shift register is any shift register described above according to the embodiments of the present disclosure.

a signal input terminal of the first shift register located in a first stage is connected with a light emitting start signal line, and signal input terminals of first shift registers located in the other stages except the first stage are connected with the light emitting cascade signal output terminal of the first shift registers in a respective preceding stage;

the light emitting control drive signal output terminal of each first shift register is electrically connected with a corresponding light emitting control signal line.

Correspondingly, a display device is also provided according to an embodiment of the present disclosure. The display device includes a display region and a peripheral region located around the display region, wherein the display region includes a plurality of pixel units arranged in an array, each row of pixel units is provided with a corresponding light emitting control signal line, and the light emitting control signal line is connected with a gate of a light emitting control transistor in a corresponding pixel unit, and the light emitting control transistor is a P-type transistor.

The peripheral region includes a first gate drive circuit, and the first gate drive circuit is a gate drive circuit according to the embodiments of the present disclosure.

In one possible implementation, in a display device according to an embodiment of the present disclosure, each row of pixel units is further provided with a corresponding first gate line connected to a gate of a data writing transistor in the pixel units, and a second gate line connected to a gate of a sensing transistor in the pixel units;

the peripheral region further includes a second gate drive circuit, the second gate drive circuit includes a plurality of cascaded second shift registers, the second shift register is configured with a first gate cascade signal output terminal, a second gate cascade signal output terminal and a third gate cascade signal output terminal, a first gate cascade signal output terminal is connected with a corresponding first gate line, a second gate cascade signal output terminal is connected with a corresponding second gate line, and a third gate cascade signal output terminal is the subsequent stage gate cascade signal output terminal in the first shift register.

DETAILED DESCRIPTION

Figure 1:
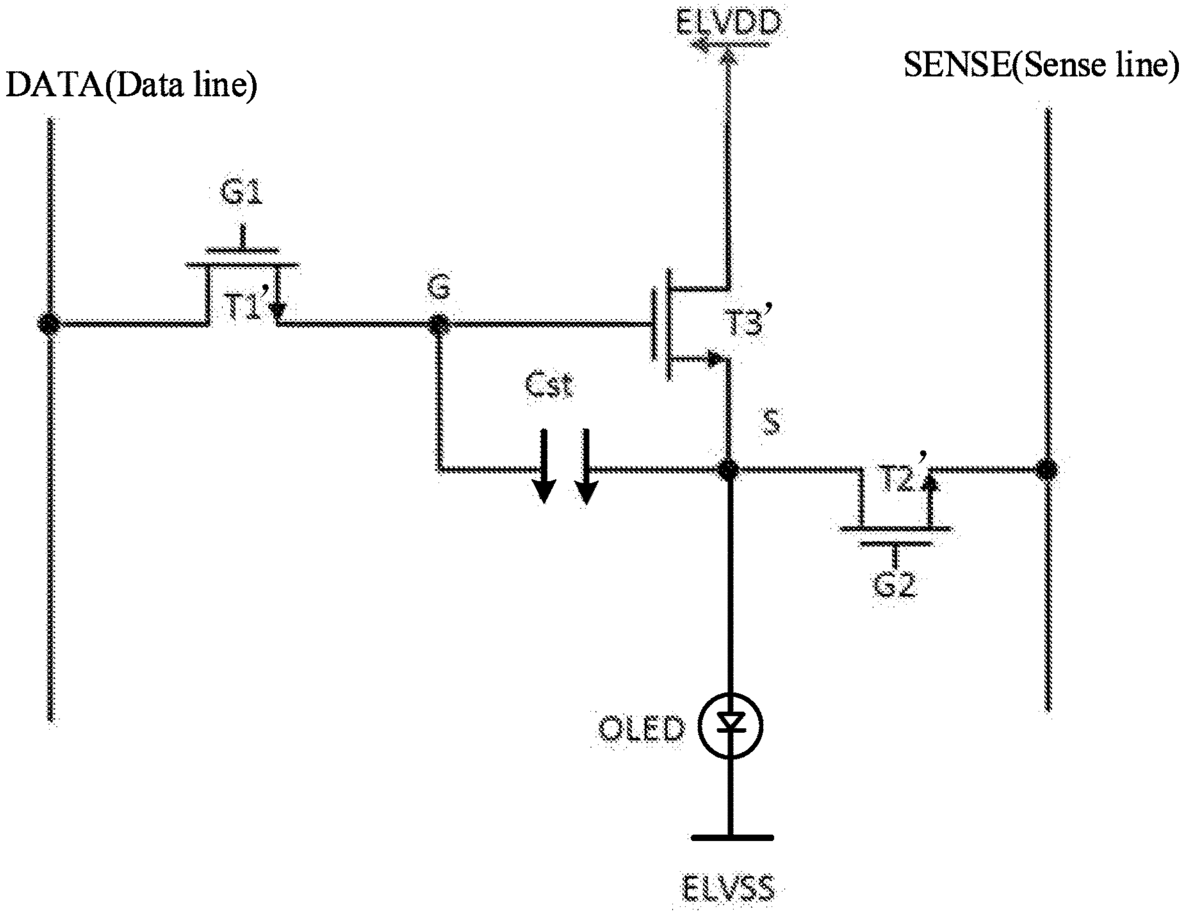
FIG. 1 is a schematic diagram of a circuit structure of a pixel unit in a display substrate related to related technologies.

To make the objectives, technical solutions and advantages of the embodiments of the present disclosure clearer, technical solutions of the embodiments of the present disclosure will be clearly and completely described below in combination with the accompany drawings of the embodiments of the present disclosure. Apparently, described embodiments are a part of the embodiments of the present disclosure, but not all of the embodiments. The embodiments and features in the embodiments of the present disclosure may be randomly combined with each other in case of no conflicts. Based on the described embodiments of the present disclosure, all other embodiments obtained by those of ordinary skills in the art without inventive effort are covered by the protection scope of the present disclosure.

Unless otherwise defined, technical terms or scientific terms used in the present disclosure should have common meanings as understood by those of ordinary skill in the art that the present disclosure belongs to. “Include”, “contain”, or similar words in the present disclosure mean that elements or objects appearing before the words cover elements or objects listed after the words and their equivalents, but do not exclude other elements or objects. “Connect”, “join”, or a similar term is not limited to a physical or mechanical connection, but may include an electrical connection, whether direct or indirect. “Inner”, “outer”, “upper”, “lower”, etc., are used to represent relative position relations, and when an absolute position of a described object is changed, the relative position relation may also be correspondingly changed.

It should be noted that sizes and shapes of various figures in the drawings do not reflect actual scales, and are only for the purpose of schematically illustrating contents of the present disclosure. Moreover, same or similar elements and elements having same or similar functions are denoted by same or similar reference numerals throughout the descriptions.

Transistors used in all embodiments of the present disclosure may be thin film transistors or field effect tubes or other devices with same characteristics. In the embodiments of the present disclosure, a coupling mode of a drain with a source of each transistor is interchangeable. Therefore, in the embodiments of the present disclosure, there is no difference between the drain and the source of each transistor, in fact. To distinguish two poles of a transistor except a gate, one of the two poles is referred to as the drain and the other one of the two poles is referred to as the source. A thin film transistor used in the embodiments of the present disclosure may be an N-type transistor or a P-type transistor.

In the embodiments of the present disclosure, an "active level signal" refers to a signal that can control a transistor to turn on after being input to a gate of the transistor, and an "inactive level signal" refers to a signal that can control a transistor to turn off after being input to a gate of the transistor. For an N-type transistor, a high level signal is an active level signal and a low level signal is an inactive level signal. For a P-type transistor, a low level signal is an active level signal and a high level signal is an inactive level signal.

Figure 2:
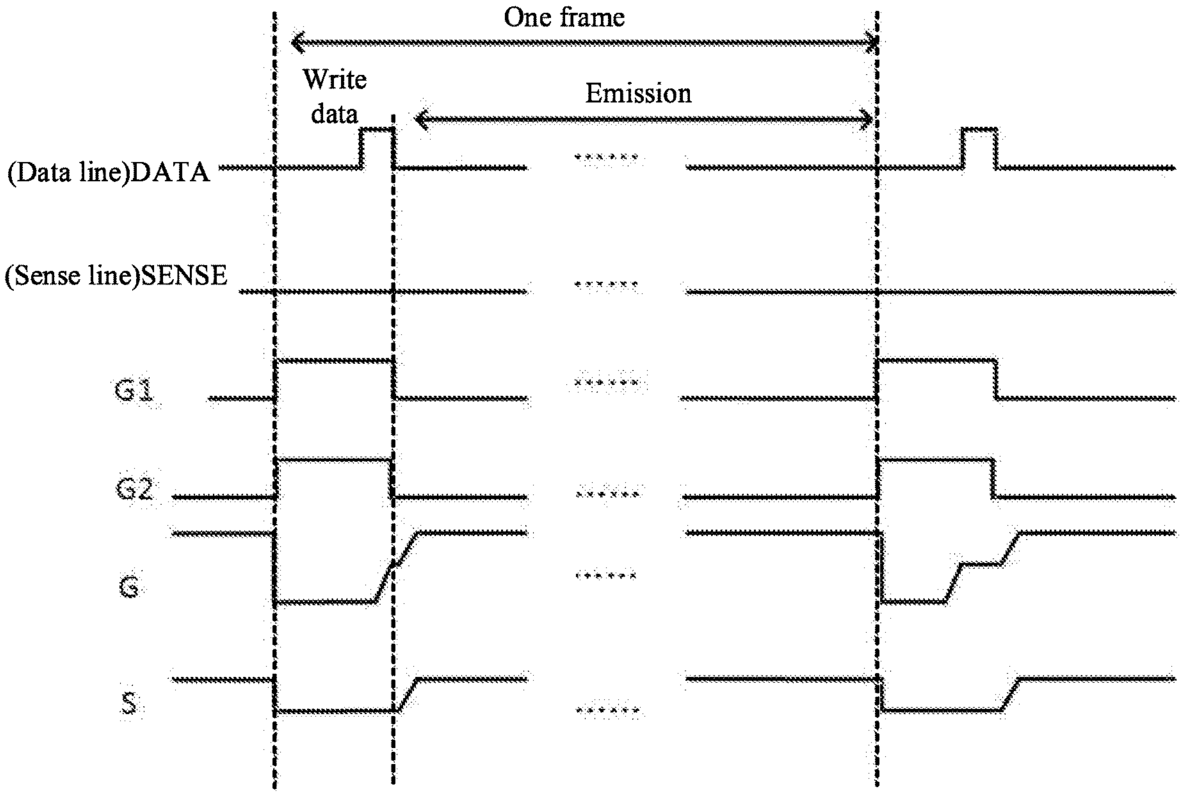
FIG. 2 is a timing diagram illustrating working of the pixel circuit shown in FIG. 1.

FIG. 1 is a schematic diagram of a structure of a pixel circuit in a pixel unit in a display substrate according to related technologies. FIG. 2 is a timing diagram illustrating working of the pixel circuit shown in FIG. 1. As shown in FIGS. 1 and 2, the pixel circuit has a 3T1C structure that includes three transistors (a data writing transistor T1', a driving transistor T3' and a sensing transistor T2') and one capacitor (a storage capacitor Cst). A gate of the data writing transistor T1' is connected to a first gate line G1, a first pole of the data writing transistor T1' is connected to a data line DATA, a gate of the sensing transistor T2' is connected to the second gate line G2, and a first pole of the sensing transistor T2' is connected to a sensing line SENSE.

A single pixel unit needs to experience a writing display data stage and a light emitting stage during one frame. During the writing display data stage, the first gate line G1 controls the data writing transistor T1' to turn on, and the data line DATA writes a data voltage Vdata to a gate of the driving transistor T3'. In the light emitting stage, the driving transistor T3' outputs a corresponding driving current according to a voltage at the gate of the driving transistor T3', so as to drive a light emitting element OLED to emit light.

In addition, a blank period (also referred to as Blank period) is generally provided between two adjacent frames, where one frame includes a display drive period and a blank period, and the blank period can generally be used for randomly performing external compensation sensing on a certain pixel unit row.

In the pixel unit shown in FIG. 1, a display brightness of the light emitting element OLED in one frame can be controlled by the data voltage Vdata only, and the data voltage Vdata is output by a driving chip (IC), causing that the expansion cannot be performed for some low gray scales when the IC has an insufficient accuracy. For example, the accuracy of the IC is 0.1 V, and the gray scale corresponding to 0.1 V data voltage is L20. At that time, the IC cannot accurately output gray scales corresponding to L1 L19.

Figure 3:
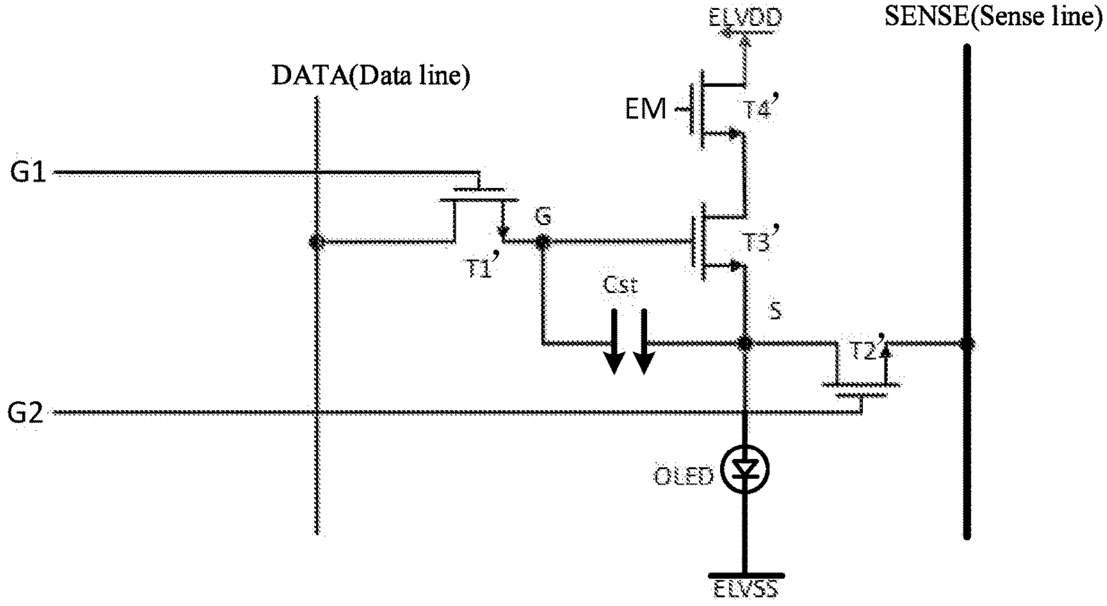
FIG. 3 is a schematic diagram of another circuit structure of a pixel unit in a display substrate related to related technologies.
Figure 4A:
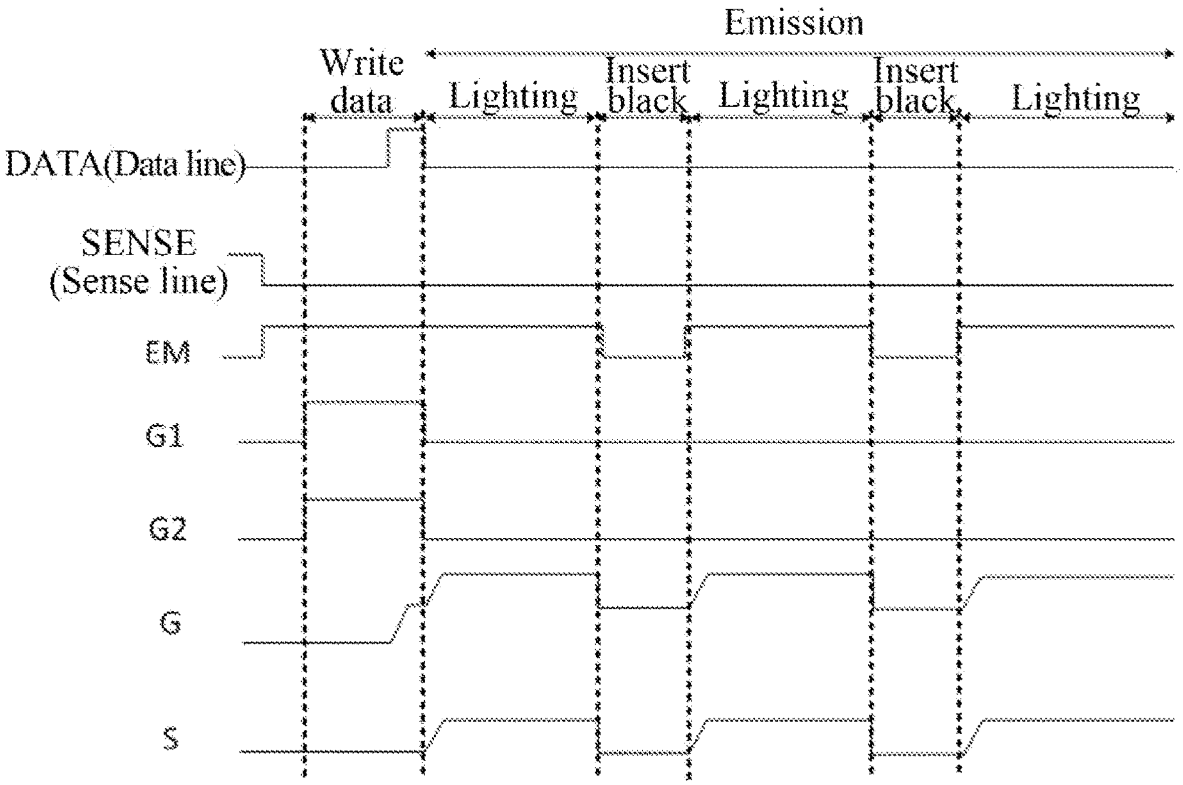
FIG. 4A is a timing diagram illustrating working of the pixel circuit shown in FIG. 3.
Figure 4B:
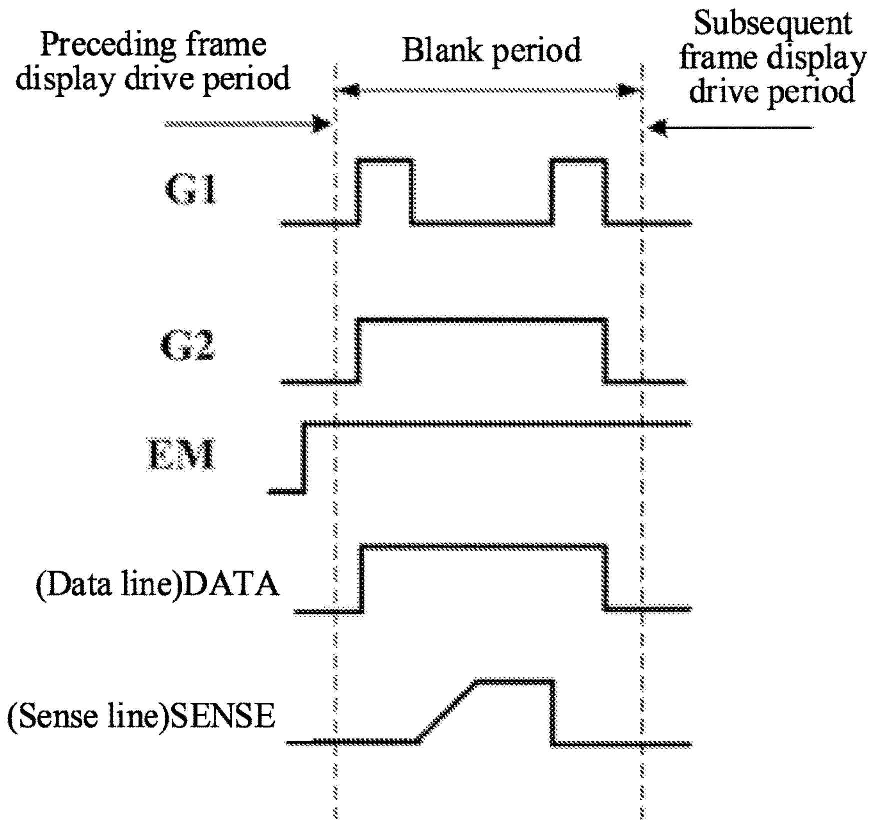
FIG. 4B is a timing diagram illustrating working of the pixel unit shown in FIG. 3 performing external compensation sensing in a blank period.

To solve the above-mentioned technical problem, the pixel circuit structure in the pixel unit has been improved in the related technologies. FIG. 3 is a schematic diagram of a structure of another pixel circuit of the pixel unit in the display substrate related to the related technologies, FIG. 4A is a timing diagram illustrating working of the pixel circuit shown in FIG. 3, and FIG. 4B is a timing diagram illustrating working of the pixel circuit shown in FIG. 3 performing external compensation sensing in a blank period. As shown in FIGS. 3 to 4B, the new pixel circuit, which is according to the related technologies, has a 4T1C structure that includes not only the data writing transistor T1', the driving transistor T3', the sensing transistor T2' in FIG. 1, but also a light emitting control transistor T4'. As an example, as shown in FIG. 3, the light emitting control transistor T4' is disposed between the driving transistor T3' and the power supply terminal ELVDD, and a gate of the light emitting control transistor T4' is connected to the light emitting control signal line EM. As another example, the light emitting control transistor T4' may be disposed between the driving transistor T3' and the light emitting device OLED (no corresponding drawing is given).

Referring to FIG. 4A, for a single pixel unit, the light emitting control transistor T4' is controlled to turn on or off by the light emitting control signal line EM during the light emitting stage, so that a lighting period of the light emitting element OLED in the light emitting stage can be controlled, such that an equivalent brightness of the light emitting element OLED in one frame (i.e., a brightness perceived by human eyes, also referred to as sensory brightness) can be controlled. Specifically, the light emitting stage includes a lighting stage and a black insertion stage, and a light emitting control signal includes a light emitting drive signal and a black insertion drive signal. During the lighting stage, the light emitting control transistor T4' is controlled to turn on by providing a light emitting drive signal (i.e., an active level signal) through the light emitting control signal line EM, and the driving transistor T3' can normally output a driving current and the light emitting element OLED emits light. During the black insertion stage, the light emitting control transistor T4' is controlled to turn off by providing a black insertion drive signal (i.e., an inactive level signal) through the light emitting control signal line EM, and at that time, a driving transistor DTFT has no driving current output and the light emitting element does not emit light. Generally, the longer a total duration of the black insertion stage, the lower the equivalent brightness of the light emitting element.

FIG. 4A exemplarily illustrates a case in which the light emitting stage includes two black insertion stages, although in practical applications, the light emitting stage may also include one black insertion stage, three black insertion stages, or more black insertion stages.

It can be seen from the above contents that by providing the light emitting control transistor T4', the light emitting element OLED can present the brightness corresponding to the lower gray scales, thereby effectively solving a problem that the pixel unit cannot present the brightness corresponding to the low gray scales with insufficient IC precision. However, in practical applications, it is found that since all shift registers in an existing gate drive circuit for providing the black insertion drive signal (commonly referred to as the light emitting control gate drive circuit) are cascaded sequentially, the existing gate drive circuit for providing the black insertion drive signal continuously and sequentially outputs the black insertion drive signal to various light emitting control signal lines. At that time, it is inevitably that light emitting control signal lines corresponding to some rows of pixel units receives the black insertion drive signal during the blank period. As can be seen from the timing shown in FIG. 4B, when external compensation sensing is performed on a certain row of pixel units, a signal provided by the light emitting control signal line EM connected to the row of pixel units is required to be always a light emitting drive signal (i.e., an active level signal). Therefore, it is impossible to perform the external compensation sensing on a row of pixel units that receive the black insertion drive signal during the blank period. That is, random external compensation sensing in a blank period cannot supported in the related technologies.

In order to effectively solve the problem that the random external compensation sensing in the blank period cannot be supported in the related technologies, a shift register is according to an embodiment of the present disclosure, and the inventive principle of the present disclosure will be described in detail in combination with specific embodiments below. It should be noted that, in order to distinguish from shift registers in other gate drive circuits on a display device, a shift register located in the light emitting control gate drive circuit in the present disclosure is referred to as a first shift register, and the first shift register can be used to provide a light emitting control signal (including light emitting drive signals and black insertion drive signals) to a corresponding light emitting control signal line.

Figure 5:
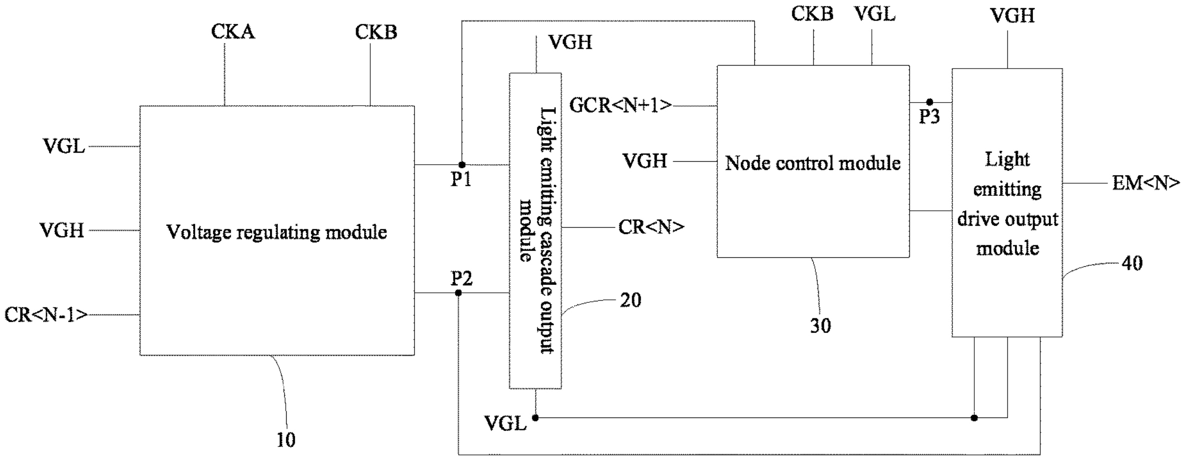
FIG. 5 is a schematic diagram of a circuit structure of a first shift register according to an embodiment of the present disclosure.
Figure 6:
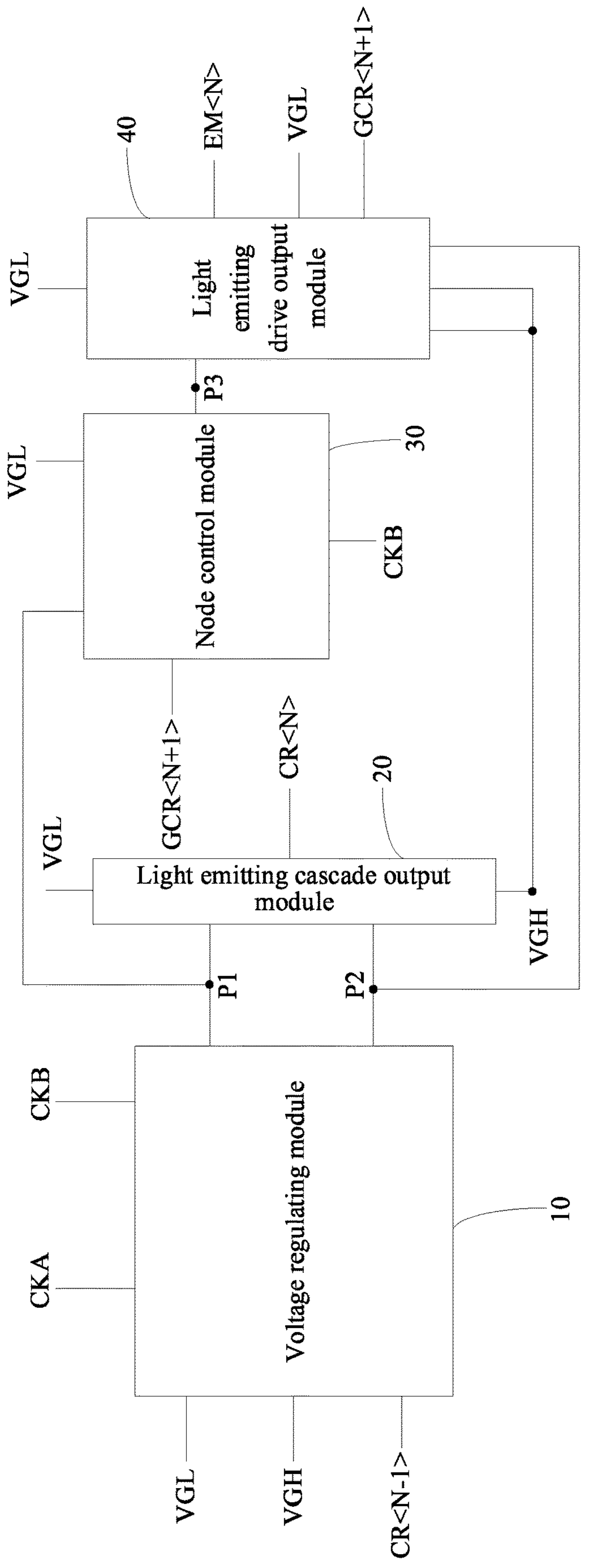
FIG. 6 is a schematic diagram of a circuit structure of a shift register according to an embodiment of the present disclosure.

FIGS. 5 and 6 are schematic diagrams of structures of two circuits of the first shift register according to the embodiments of the present disclosure, respectively. As shown in FIG. 5 and FIG. 6, the first shift register includes a voltage regulating module 10, a light emitting cascade output module 20 and node control module 30.

The voltage regulating module 10 is connected with a preceding stage light emitting cascade signal output terminal CR<N−1>, a first clock signal terminal CKA, a second clock signal terminal CKB, a first power supply terminal VGH, a second power supply terminal VGL, a first node P1 and a second node P2. The voltage regulating module 10 is configured to adjust voltages at the first node P1 and the second node P2 in response to control of signals provided by the preceding stage light emitting cascade signal output terminal CR<N−1>, the first clock signal terminal CKA, the second clock signal terminal CKB, the first power supply terminal VGH and the second power supply terminal VGL.

The light emitting cascade output module 20 is connected with the first power supply terminal VGH, the second power supply terminal VGL, a light emitting cascade signal output terminal CR<N>, the first node P1, and the second node P2, and the light emitting cascade output module 20 is configured to supply a first voltage of the first power supply terminal VGH or a second voltage of the second power supply terminal VGL to the light emitting cascade signal output terminal CR<N> in response to control of the voltage at the first node P1 and in response to control of the voltage at the second node P2.

The node control module 30 is connected with the first node P1, a subsequent stage gate cascade signal output GCR<N+1>, the second power supply terminal VGL, a third node P3, and the second clock signal terminal CKB, and is configured to adjust a voltage at a third node P3 in response to control of signals provided by the subsequent stage gate cascade signal output terminal GCR<N+1>, the first node P1, and the second clock signal terminal CKB.

As shown in FIG. 5, a light emitting drive output module 40 is connected to the second node P2 and connected to the third node P3, the first power supply terminal VGH, the second power supply terminal VGL, and a light emitting control drive signal output terminal EM<N>, the light emitting drive output module 40 is configured to supply the first voltage of the first power supply terminal VGH to the light emitting control drive signal output terminal EM<N> in response to the control of the voltage at the third node P3, to supply a second voltage of the second power supply terminal VGL to the light emitting control drive signal output terminal EM<N> in response to the control of the voltage at the second node P2, and to supply the second voltage of the second power supply terminal VGL to the light emitting control drive signal output terminal EM<N> in response to the control of the second voltage of the second power supply terminal VGL.

Alternatively, as shown in FIG. 6, a light emitting drive output module 40 is connected with the second node P2, the third node P3, the first power supply terminal VGH, the second power supply terminal VGL, the subsequent stage gate cascade signal output terminal GCR<N+1> and the light emitting control drive signal output terminal EM<N>. The light emitting drive output module 40 is configured to supply the first voltage of the first power supply terminal VGH to the light emitting control drive signal output terminal EM<N> in response to control of the voltage at the third node P3, and to supply the second voltage of the second power supply terminal VGL to the light emitting control drive signal output terminal EM<N> in response to the control of the voltage at the second node P2 and control of the subsequent stage gate cascade signal output terminal GCR<N+1>.

In an embodiment of the present disclosure, the light emitting cascade signal output terminal CR and the light emitting control drive signal output terminal EM<N> of the first shift register are disposed respectively, wherein the light emitting cascade output module 20 is used to control an output of an light emitting cascade signal output terminal CR, and the light emitting drive output module 40 controls an output of the light emitting control drive signal output terminal EM<N>. In other words, the light emitting cascade signal and the light emitting control signal output by the first shift register can be controlled separately. Based on this, in the embodiment of the present disclosure, the light emitting control signals outputted by the first shift registers can be independently controlled in a condition that normal cascaded first shift registers in the light emitting control gate drive circuit are ensured.

When a row of pixel unit needs to perform external compensation sensing and the row of pixel unit receives a black insertion drive signal (i.e. inactive level signal) in a blank period if a conventional light emitting control gate drive circuit is used for driving, in the embodiment of the present disclosure, a light emitting control drive signal output terminal EM<N> of a first shift register corresponding to the row of pixel units which needs to perform the external compensation sensing can be controlled to forcibly output the light emitting drive signal (i.e. active level signal) through the subsequent stage gate cascade signal output terminal GCR<N+1> connected to the first shift register corresponding to the row of pixel units which performs the external compensation sensing, so that the light emitting control signal received by the row of pixel units which needs to perform the external compensation sensing in the blank period is the light emitting drive signal. In other words, the row of pixel units that originally received the black insertion drive signal in the blank period and needed to perform the external compensation sensing in the blank period actually receives the light emitting drive signal in the blank period, thus ensuring the external compensation sensing process of the row of pixel units.

Figure 7:
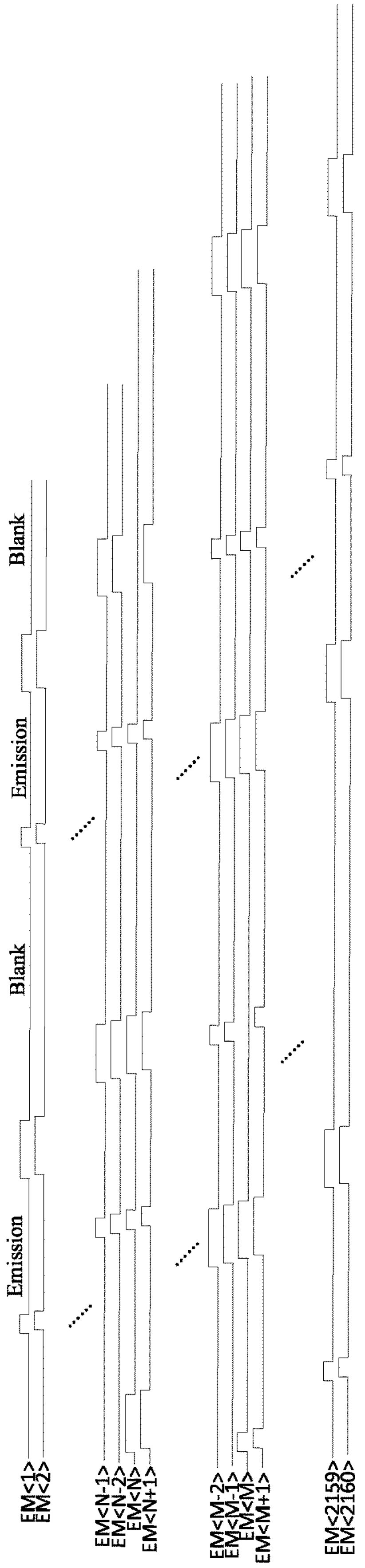
FIG. 7 is a timing diagram illustrating driving of the light emitting control gate drive circuit according to the present disclosure.

Hereinafter, technical solutions in the embodiments of the present disclosure will be described in detail in combination with specific examples. As shown in FIG. 7, FIG. 7 is a timing diagram illustrating driving of the light emitting control gate drive circuit according to the present disclosure, wherein EM<i> indicates an i-th light emitting control signal line (i.e. a light emitting control signal line provided in an i-th row pixel unit), i is an integer and 1≤i≤n, and n is a total row number of pixel units, which is 2160 as an example in the embodiment of the present disclosure. An M-th row of pixel units is a row of pixel units that needs to perform the external compensation sensing.

As shown in FIG. 7, in the embodiment of the present disclosure, the light emitting cascade signal output terminal CR<N> and the light emitting control drive signal output terminal EM<N> of each first shift register in the light emitting control gate drive circuit are configured respectively. In a condition that the first shift registers in the light emitting control gate drive circuit are normally cascaded, the light emitting control signals output by the first shift registers can be controlled independently, so that a light emitting drive output module in a first shift register connected to the M-th row of pixel units can be controlled to operate in the blank period, the light emitting control drive signal output terminal EM<N> of the first shift register connected to the M-th row of pixel units can constantly output the light emitting drive signal (i.e., active level signal) in the blank period, thereby ensuring that the M-th row of pixel units can perform the external compensation sensing normally. In addition, since the first shift registers in the light emitting control gate drive circuit are cascaded normally, a first shift registers corresponding to an (M+1)-th row of pixel units can normally output the black insertion drive signal in the blank period.

Figure 8:
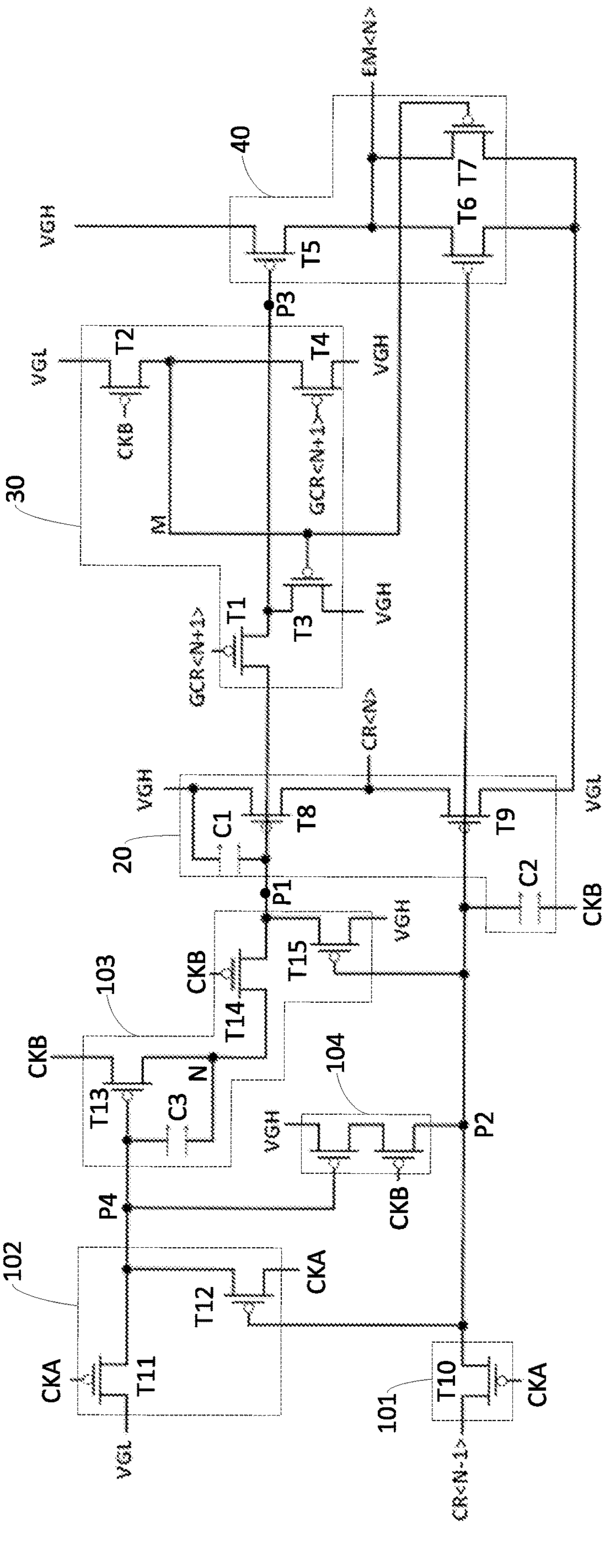
FIG. 8 is a schematic diagram of a circuit structure of a first shift register in an embodiment of the present disclosure.

FIG. 8 is a schematic diagram of a structure of another circuit of a first shift register in an embodiment of the present disclosure. As shown in FIG. 8, in some embodiments, a node control module 30 in the first shift register may include a first switching transistor T1, a second switching transistor T2, a third switching transistor T3 and a fourth switching transistor T4.

A gate of the first switching transistor T1 is electrically connected with the subsequent stage gate cascade signal output terminal GCR<N+1>, a first pole of the first switching transistor T1 is electrically connected with a first node P1, and a second pole of the first switching transistor T1 is electrically connected with a third node P3.

A gate of the second switching transistor T2 is electrically connected with the second clock signal terminal CKB, a first pole of the second switching transistor T2 is electrically connected with the second power supply terminal VGL, and a second pole of the second switching transistor T2 is electrically connected with a gate of the third switching transistor T3.

A first pole of the third switching transistor T3 is electrically connected with the first power supply terminal VGH, and a second pole of the third switching transistor T3 is electrically connected with the third node P3.

A gate of the fourth switching transistor T4 is electrically connected with the subsequent stage gate cascade signal output terminal GCR<N+1>, a first pole of the fourth switching transistor T4 is electrically connected with the first power supply terminal VGH, and a second pole of the fourth switching transistor T4 is electrically connected with the second pole of the second switching transistor T2.

It should be noted that the node control module 30 in the embodiment of the present disclosure is not limited to the case shown in FIG. 8, and the circuit configuration of the node control module 30 shown in FIG. 8 is only exemplary, which does not limit the technical schemes of the present disclosure.

In some embodiments, in the above-mentioned first shift register according to the embodiments of the present disclosure, as shown in FIG. 8, the light emitting drive output module 40 may include a fifth switching transistor T5, a sixth switching transistor T6 and a seventh switching transistor T7.

A gate of the fifth switching transistor T5 is electrically connected with the third node P3, a first pole of the fifth switching transistor T5 is electrically connected with the first power supply terminal VGH, and a second pole of the fifth switching transistor T5 is electrically connected with the light emitting control drive signal output terminal EM<N>.

A gate of the sixth switching transistor T6 is electrically connected to the second node P2, a first pole of the sixth switching transistor T6 is electrically connected with the second power supply terminal VGL, and a second pole of the sixth switching transistor T6 is electrically connected with the light emitting control drive signal output terminal EM<N>.

A gate of the seventh switching transistor T7 is electrically connected with the second pole of the second switching transistor T2, a first pole of the seventh switching transistor T7 is electrically connected with the second power supply terminal VGL, and a second pole of the seventh switching transistor T7 is electrically connected with the light emitting control drive signal output terminal EM<N>.

In some embodiments, in the above-mentioned first shift register according to the embodiments of the present disclosure, as shown in FIG. 8, the light emitting cascade output module 20 may include an eighth switching transistor T8, a first capacitor C1, a ninth switching transistor T9 and a second capacitor C2.

A gate of the eighth switching transistor T8 is electrically connected with the first node P1, a first pole of the eighth switching transistor T8 is electrically connected with the first power supply terminal VGH, and a second pole of the eighth switching transistor T8 is electrically connected with the light emitting cascade signal output terminal CR<N>.

A first terminal of the first capacitor C1 is electrically connected between the first power supply terminal VGH and the first pole of the eighth switching transistor T8, and a second terminal of the first capacitor C1 is electrically connected with the gate of the eighth switching transistor T8.

A gate of the ninth switching transistor T9 is electrically connected with the second node P2, a first pole of the ninth switching transistor T9 is electrically connected with the second power supply terminal VGL, and a second pole of the ninth switching transistor T9 is electrically connected with the light emitting cascade signal output terminal CR<N>.

A first terminal of the second capacitor C2 is electrically connected with the second clock signal terminal CKB, and a second terminal of the second capacitor C2 is electrically connected with the second node P2. The first capacitor C1 and the second capacitor C2 are configured to improve the voltage stability at the first node P1 and the second node P2.

In some embodiments, in the above-mentioned first shift register according to embodiments of the present disclosure, as shown in FIG. 8, the voltage regulating module 10 may include a first input sub-module 101, a second input sub-module 102, a first voltage control sub-module 103 and a second voltage control sub-module 104.

The first input sub-module 101 is connected with the preceding stage light emitting cascade signal output terminal CR<N−1>, the first clock signal terminal CKA and the second node P2, and the first input sub-module 101 is configured to provide a signal of the preceding stage light emitting cascade signal output terminal CR<N−1> to the second node P2 in response to control of a signal of the first clock signal terminal CKA. Optionally, the first input sub-module 101 may include a tenth switching transistor T10, a gate of the tenth switching transistor T10 is electrically connected with the first clock signal terminal CKA, a first pole of the tenth switching transistor T10 is electrically connected with the preceding stage light emitting cascade signal output terminal CR<N−1>, and a second pole of the tenth switching transistor T10 is electrically connected with the second node P2.

The second input sub-module 102 is connected with the first clock signal terminal CKA, the second power supply terminal VGL, the second node P2 and the fourth node P4, and the second input sub-module 102 is configured to supply the second voltage of the second power supply terminal VGL to the fourth node P4 in response to the control of the signal of the first clock signal terminal CKA, and to provide the signal of the first clock signal terminal CKA to the fourth node P4 in response to control of the voltage at the second node P2. Optionally, the second input sub-module 102 includes an eleventh switching transistor T11 and a twelfth switching transistor T12. A gate of the eleventh switching transistor T11 is electrically connected to the first clock signal terminal CKA, a first pole of the eleventh switching transistor T11 is electrically connected with the second power supply terminal VGL, and a second pole of the eleventh switching transistor T11 is electrically connected with the fourth node P4. A gate of the twelfth switching transistor T12 is electrically connected with the second node P2, a first pole of the twelfth switching transistor T12 is electrically connected to the first clock signal terminal CKA, and a second pole of the twelfth switching transistor T12 is electrically connected with the fourth node P4.

The first voltage control sub-module 103 is connected with the first node P1, the second node P2, the fourth node P4, the second clock signal terminal CKB and the first power supply terminal VGH, and the first voltage control sub-module 103 is configured to provide a signal of the second clock signal terminal CKB to the first node P1 in response to control of the voltage at the fourth node P4 and the signal of the second clock signal terminal CKB, and to provide the first voltage of the first power supply terminal VGH to the first node P1 in response to the control of the voltage at the second node P2. Optionally, the first voltage control sub-module 103 may include a thirteenth switching transistor T13, a fourteenth switching transistor T14, a fifteenth switching transistor T15 and a third capacitor C3. A gate of the thirteenth switching transistor T13 is electrically connected with the fourth node P4, a first pole of the thirteenth switching transistor T13 is electrically connected with the second clock signal terminal CKB, and a second pole of the thirteenth switching transistor T13 is electrically connected with a first pole of the fourteenth switching transistor T14. A gate of the fourteenth switching transistor T14 is electrically connected with the second clock signal terminal CKB, and a second pole of the fourteenth switching transistor T14 is electrically connected with the first node P1. A gate of the fifteenth switching transistor T15 is electrically connected with the second node P2, a first pole of the fifteenth switching transistor T15 is electrically connected with the first power supply terminal VGH, and a second pole of the fifteenth switching transistor T15 is electrically connected with the first node P1. A first terminal of the third capacitor C3 is electrically connected with the fourth node P4, and a second terminal of the third capacitor C3 is electrically connected with the second pole of the thirteenth switching transistor T13. The third capacitor C3 is configured to improve the voltage stability at the fourth node P4.

The second voltage control sub-module 104 is connected with the second node P2, the fourth node P4, the second clock signal terminal CKB, and the first power supply terminal VGH, and the second voltage control sub-module 104 is configured to provide a first voltage of the first power supply terminal VGH to the second node P2 in response to the control of the voltage at the fourth node P4 and the signal of the second clock signal terminal CKB. Optionally, the second voltage control sub-module 104 may include a sixteenth switching transistor T16 and a seventeenth switching transistor T17. A gate of the sixteenth switching transistor T16 is electrically connected with the fourth node P4, a first pole of the sixteenth switching transistor T16 is electrically connected with the first power supply terminal VGH, and a second pole of the sixteenth switching transistor T16 is electrically connected with a first pole of the seventeenth switching transistor T17. A gate of the seventeenth switching transistor T17 is electrically connected with the second clock signal terminal CKB, and a second pole of the seventeenth switching transistor T17 is electrically connected with the second node P2.

In some embodiments, in order to unify the fabrication process, in the above-mentioned first shift register according to the embodiments of the present disclosure, as shown in FIG. 8, all of the first switching transistor T1 to the seventeenth switching transistor T17 may be P-type transistors.

Figure 9:
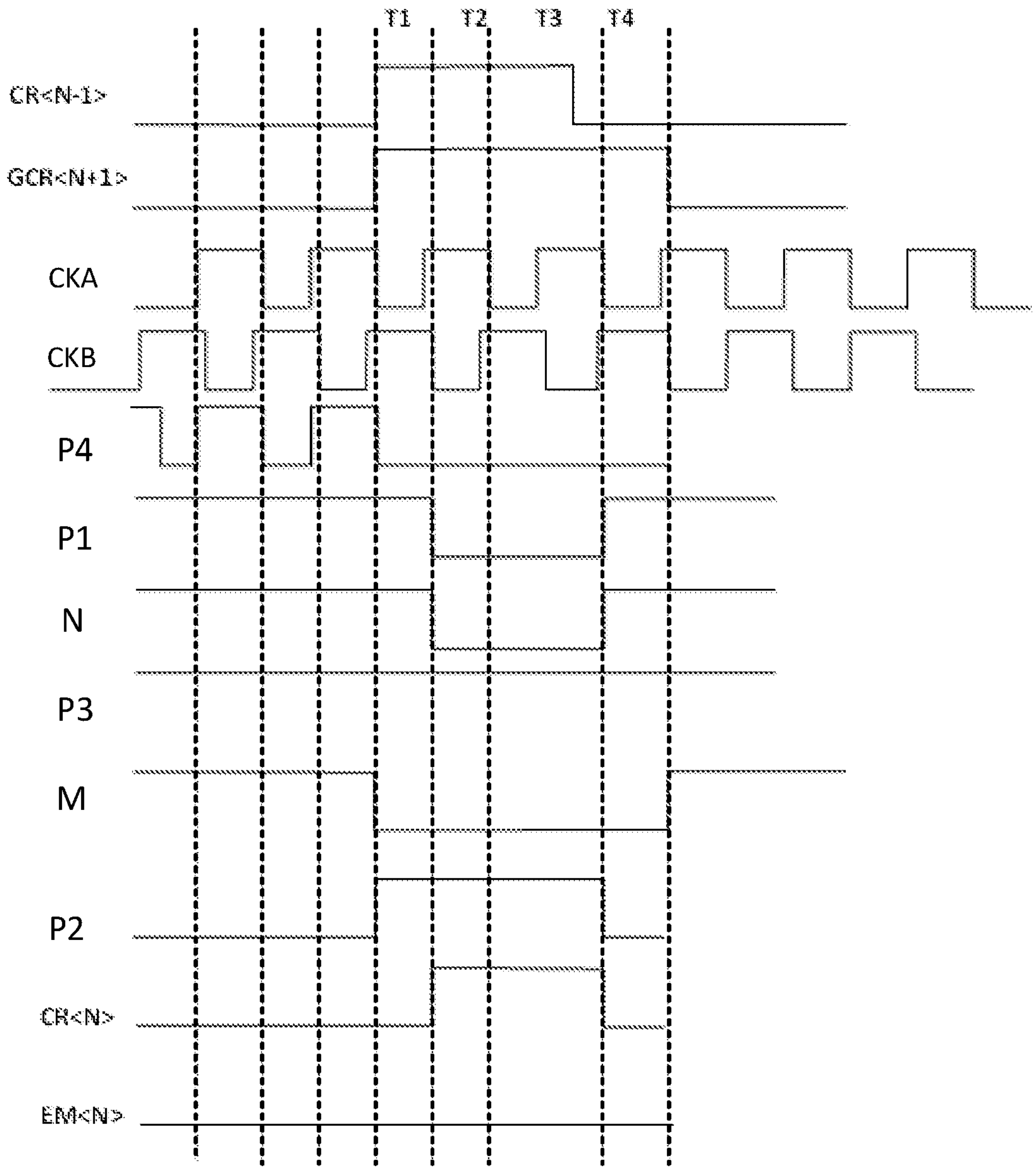
FIG. 9 is a timing diagram illustrating working of the first shift register shown in FIG. 8.

FIG. 9 is a timing diagram illustrating working of the first shift register shown in FIG. 8. As shown in FIG. 9, the first voltage supplied by the first power supply terminal VGH is a high level voltage, and the second voltage supplied by the second power supply terminal VGL is a low level voltage. The process of the first shift register outputting the light emitting control drive signal through the light emitting control drive signal output terminal EM<N> and outputting the light emitting cascade signal through the light emitting cascade signal output terminal CR<N> is described in detail below. The process of outputting the light emitting control drive signal and outputting the light emitting cascade signal by the first shift register shown in FIG. 9 includes a first stage T1, a second stage T2, a third stage T3 and a fourth stage T4.

In the first stage T1, the preceding stage light emitting cascade signal output terminal CR<N−1> provides a high level signal, the subsequent stage gate cascade signal output terminal GCR<N+1> provides a high level signal, the first clock signal terminal CKA provides a low level signal, and the second clock signal terminal CKB provides a high level signal. Specifically, when the first clock signal terminal CKA provides a low level signal, the tenth switching transistor T10 and the eleventh switching transistor T11 are turned on. When the high level signal provided by the preceding stage light emitting cascade signal output terminal CR<N−1> is provided to the second node P2, the twelfth switching transistor T12 is turned off. When a low level voltage supplied by the second power supply terminal VGL is supplied to the fourth node P4, since a voltage at the second node P2 is a high level signal, all of the fifteenth switching transistor T15, the ninth switching transistor T9 and the sixth switching transistor T6 are turned off. Since a voltage at the fourth node P4 is a low level signal, the thirteenth switching transistor T13 is turned on, and the high level signal provided by the second clock signal terminal CKB is provided to a point N. Since the second clock signal terminal CKB provides a high level signal, both of the second switching transistor T2 and the fourteenth switching transistor T14 are turned off, the first node P1 remains a high level, then the eighth switching transistor T8 is turned off, and an point M remains a low level signal, both of the third switching transistor T3 and the seventh switching transistor T7 are turned on, a high level signal provided by the first power supply terminal VGH is provided to the third node P3. Since the subsequent stage gate cascade signal output terminal GCR<N+1> provides a high level signal, both of the first switching transistor T1 and the fourth switching transistor T4 are turned off. Since a voltage at the third node P3 is a high level signal, the fifth switching transistor T5 is turned off. Since the seventh switching transistor T7 is turned on, the low level signal provided by the second power supply terminal VGL is provided to the light emitting control drive signal output terminal EM<N>. Therefore, the light emitting control drive signal output terminal EM<N> of the first shift register according to the embodiments of the present disclosure outputs a low level signal in the first stage T1.

In the second stage T2, the preceding stage light emitting cascade signal output terminal CR<N−1> provides a high level signal, the subsequent stage gate cascade signal output terminal GCR<N+1> provides a high level signal, the first clock signal terminal CKA provides a high level signal, and the second clock signal terminal CKB provides a low level signal. Specifically, the first clock signal terminal CKA provides a high level signal, then the tenth switching transistor T10 and the eleventh switching transistor T11 are turned off. The second clock signal terminal CKB provides a low level signal, then the fourth node P4 turns to a lower level through a bootstrap action of the third capacitor C3. The voltage at the second node P2 remains a high level signal, all of the twelfth switching transistor T12, the fifteenth switching transistor T15, the ninth switching transistor T9 and the sixth switching transistor T6 are turned off, and the thirteenth switching transistor T13 is turned on. The low level signal provided by the second clock signal terminal CKB is provided to the point N, the fourteenth switching transistor T14 is turned on, then the low level signal at the point N is provided to the first node P1, both of the point N and the first node P1 turns to a low potential, then the eighth switching transistor T8 is turned on, CR<N> outputs a high level signal. However, at that time, GCR<N+1> is at a high level, such that the point M turns to a low level signal, then both of the third switching transistor T3 and the seventh switching transistor T7 are turned on, wherein the third switching transistor T3 is turned on to pull up the voltage at the third node P3, and both of the first switching transistor T1 and the fifth switching transistor T5 are turned off, the seventh switching transistor T7 is turned on, then the low level signal provided by the second power supply terminal VGL is provided to the light emitting control drive signal output terminal EM<N>. Therefore, the light emitting control drive signal output terminal EM<N> of the first shift register according to the embodiments of the present disclosure outputs a low level signal in the second stage T2.

In the third stage T3, the preceding stage light emitting cascade signal output terminal CR<N−1> provides a high level signal, the subsequent stage gate cascade signal output terminal GCR<N+1> provides a high level signal, the first clock signal terminal CKA provides a low level signal, and the second clock signal terminal CKB provides a high level signal. When the voltage at the second node P2 remains at a high level due to the bootstrap action of the second capacitor C2, the twelfth switching transistor T12, the fifteenth switching transistor T15, the ninth switching transistor T9 and the sixth switching transistor T6 are all turned off, the voltage at the fourth node P4 remains at a low level due to the bootstrap action of the third capacitor C3, the point N and the first node P1 remain at a low level, the eighth switching transistor T8 is turned on, CR<N> outputs a high level signal, and the point M remains at a low level signal, the third switching transistor T3 and the seventh switching transistor T7 are turned on, the third switching transistor T3 is turned on to pull up the voltage at the third node P3, the first switching transistor T1 and the fifth switching transistor T5 are turned off, and the seventh switching transistor T7 is turned on, and the low level signal provided by the second power supply terminal VGL is provided to the light emitting control drive signal output terminal EM<N>. Therefore, the light emitting control drive signal output terminal EM<N> of the first shift register according to the embodiments of the present disclosure outputs a low level signal in the third stage T3.

In the fourth stage T4, the preceding stage light emitting cascade signal output terminal CR<N−1> provides a low level signal, the subsequent stage gate cascade signal output terminal GCR<N+1> provides a high level signal, the first clock signal terminal CKA provides a low level signal, and the second clock signal terminal CKB provides a high level signal. Since both of the first clock signal terminals CKA and CR<N−1> provide low level signals, the tenth switching transistor T10 is turned on. The second node P2 turns to a low level signal, all of the twelfth switching transistor T12, the fifteenth switching transistor T15, the ninth switching transistor T9 and the sixth switching transistor T6 are turned on. The fourth node P4 is at a low level, the thirteenth switching transistor T13 is turned on, and the point N turn to a high level. Since the fifteenth switching transistor T15 is turned on, the high level signal of the first power supply terminal VGH is provided to the first node P1, the first node P1 turns to a high level, and the eighth switching transistor T8 is turned off. Since the ninth switching transistor T9 is turned on, the low level signal of the second power supply terminal VGL is provided to the light emitting cascade signal output terminal CR<N>, the point M remains at a low level signal, then both of the third switching transistor T3 and the seventh switching transistor T7 are turned on. When the third switching transistor T3 is turned on and the third node P3 is pulled up, then both of the first switching transistor T1 and the fifth switching transistor T5 are turned off. The seventh switching transistor T7 is turned on, the low level signal provided by the second power supply terminal VGL is provided to the light emitting control drive signal output terminal EM<N>. Therefore, the light emitting control drive signal output terminal EM<N> of the first shift register according to the embodiments of the present disclosure outputs a low level signal in the fourth stage T4.

Therefore, the first shift register, as shown in FIG. 8, which is provided in the embodiment of the present disclosure can ensure that EM<N> constantly outputs a low level signal (i.e. active level signal). Compared with receiving a black insertion drive signal in the blank period and needs to perform the external compensation sensing in the blank period in the past, the row of pixel unit actually receives a light emitting drive signal in the blank period, thus the external compensation sensing process of the row of pixel units can be ensured.

Figure 10:
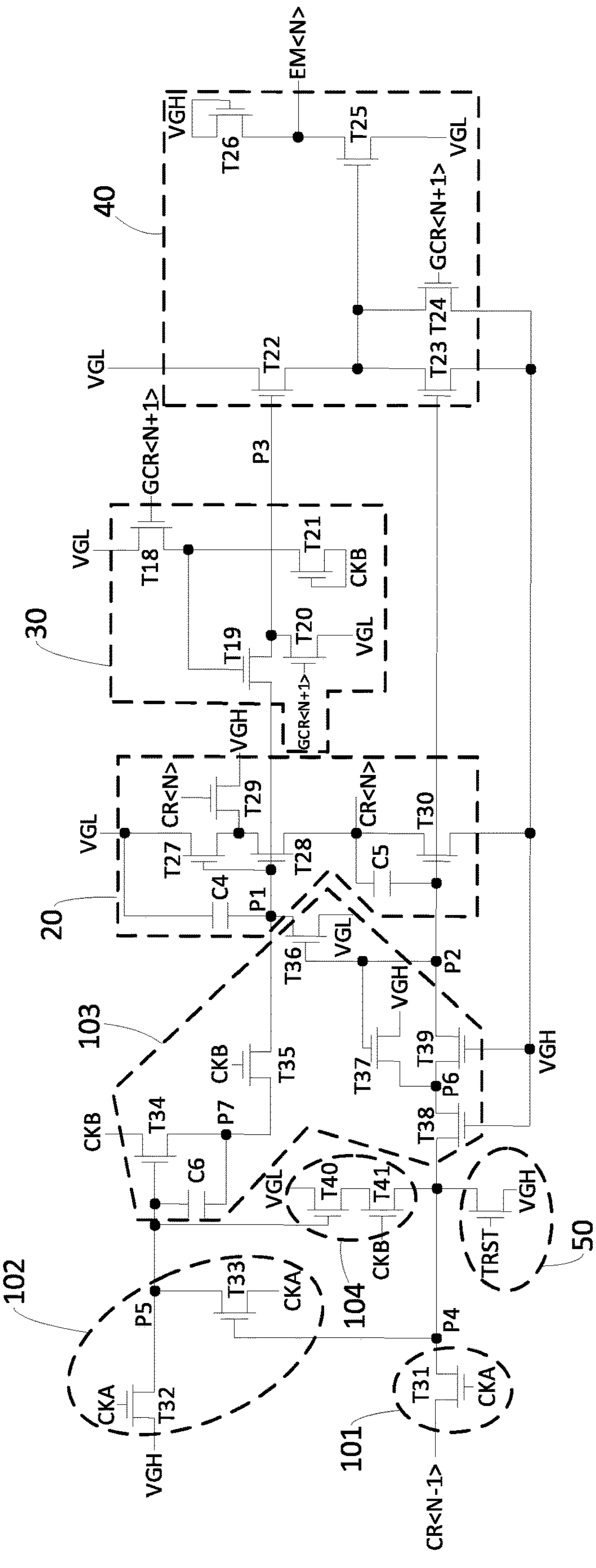
FIG. 10 is a schematic diagram of a circuit structure of a shift register in an embodiment of the present disclosure.

FIG. 10 is a schematic diagram of a structure of another circuit of a first shift register in an embodiment of the present disclosure. As shown in FIG. 10, a node control module 30 in the first shift register may include an eighteenth switching transistor T18, a nineteenth switching transistor T19, a twentieth switching transistor T20 and a twenty-first switching transistor T21.

A gate of the eighteenth switching transistor T18 is electrically connected with the subsequent stage gate cascade signal output terminal GCR<N+1>, a first pole of the eighteenth switching transistor T18 is electrically connected with the second power supply terminal VGL, and a second pole of the eighteenth switching transistor T18 is electrically connected with a gate of the nineteenth switching transistor T19.

A first pole of the nineteenth switching transistor T19 is electrically connected with the first node P1, and a second pole of the nineteenth switching transistor T19 is electrically connected with the third node P3.

A gate of the twentieth switching transistor T20 is electrically connected with the subsequent stage gate cascade signal output terminal GCR<N+1>, a first pole of the twentieth switching transistor T20 is electrically connected with the second power supply terminal VGL, and a second pole of the twentieth switching transistor T20 is electrically connected with the third node P3.

Both of a gate and a first pole of the twenty-first switching transistor T21 are electrically connected with the second clock signal terminal CKB, and a second pole of the twenty-first switching transistor T21 is electrically connected with the second pole of the eighteenth switching transistor T18.

In some embodiments, in the above-mentioned first shift register according to the embodiments of the present disclosure, as shown in FIG. 10, the light emitting drive output module 40 may include a twenty-second switching transistor T22, a twenty-third switching transistor T23, a twenty-fourth switching transistor T24, a twenty-fifth switching transistor T25, and a twenty-sixth switching transistor T26.

A gate of the twenty-second switching transistor T22 is electrically connected with the third node P3, a first pole of the twenty-second switching transistor T22 is electrically connected with the second power supply terminal VGL, and a second pole of the twenty-second switching transistor T22 is electrically connected with a gate of the twenty-fifth switching transistor T25.

A gate of the twenty-third switching transistor T23 is electrically connected with the second node P2, a first pole of the twenty-third switching transistor T23 is electrically connected with the first power supply terminal VGH, and a second pole of the twenty-third switching transistor T23 is electrically connected to the gate of the twenty-fifth switching transistor T25.

A gate of the twenty-fourth switching transistor T24 is electrically connected with the subsequent stage gate cascade signal output terminal GCR<N+1>, a first pole of the twenty-fourth switching transistor T24 is electrically connected with the first power supply terminal VGH, and a second pole of the twenty-fourth switching transistor T24 is electrically connected with the gate of the twenty-fifth switching transistor T25.

A first pole of the twenty-fifth switching transistor T25 is electrically connected with the second power supply terminal VGL, and a second pole of the twenty-fifth switching transistor T25 is electrically connected with the light emitting control drive signal output terminal EM<N>.

Both of a gate and a first pole of the twenty-sixth switching transistor T26 is electrically connected with the first power supply terminal VGH, a second pole of the twenty-sixth switching transistor T26 is electrically connected with the light emitting control drive signal output terminal EM<N>.

In some embodiments, in the above-mentioned first shift register according to the embodiments of the present disclosure, as shown in FIG. 10, the light emitting cascade output module 20 may include a twenty-seventh switching transistor T27, a twenty-eighth switching transistor T28, a twenty-ninth switching transistor T29, a fourth capacitor C4, a thirtieth switching transistor T30 and a fifth capacitor C5.

A gate of the twenty-seventh switching transistor T27 is electrically connected with the first node P1, a first pole of the twenty-seventh switching transistor T27 is electrically connected with the second power supply terminal VGL, and a second pole of the twenty-seventh switching transistor T27 is electrically connected with a first pole of the twenty-eighth switching transistor T28.

A gate of the twenty-eighth switching transistor T28 is electrically connected with the first node P1, and a second pole of the twenty-eighth switching transistor T28 is electrically connected with the light emitting cascade signal output terminal CR<N>.

A gate of the twenty-ninth switching transistor T29 is electrically connected with the light emitting cascade signal output terminal CR<N>, a first pole of the twenty-ninth switching transistor T29 is electrically connected with the first power supply terminal VGH, and a second pole of the twenty-ninth switching transistor T29 is electrically connected with the first pole of the twenty-eighth switching transistor T28.

A first terminal of the fourth capacitor C4 is connected with the first node P1, and a second terminal of the fourth capacitor C4 is connected with the second power supply terminal VGL.

A gate of the thirtieth switching transistor T30 is electrically connected with the second node P2, a first pole of the thirtieth switching transistor T30 is electrically connected with the first power supply terminal VGH, and a second pole of the thirtieth switching transistor T30 is electrically connected to the light emitting cascade signal output terminal CR<N>.

A first terminal of the fifth capacitor C5 is electrically connected with the second node P2, and a second terminal of the fifth capacitor C5 is electrically connected with the light emitting cascade signal output terminal CR<N>.

In some embodiments, in the above-mentioned first shift register according to embodiments of the present disclosure, as shown in FIG. 10, the voltage regulating module 10 may include a first input sub-module 101, a second input sub-module 102, a first voltage control sub-module 103 and a second voltage control sub-module 104.

The first input sub-module 101 is connected with the preceding stage light emitting cascade signal output terminal CR<N−1>, the first clock signal terminal CKA and the fourth node P4, and the first input sub-module 101 is configured to provide a signal of the preceding stage light emitting cascade signal output terminal CR<N−1> to the fourth node P4 in response to control of a signal of the first clock signal terminal CKA. Optionally, the first input sub-module 101 may include a thirty-first switching transistor T31, a gate of the thirty-first switching transistor T31 is electrically connected with the first clock signal terminal CKA, a first pole of the thirty-first switching transistor T31 is electrically connected with the preceding stage light emitting cascade signal output terminal CR<N−1>, and a second pole of the thirty-first switching transistor T31 is electrically connected with the fourth node P4.

The second input sub-module 102 is connected with the first clock signal terminal CKA, the first power supply terminal VG, the fourth node P4 and the fifth node P5, and the second input sub-module 102 is configured to supply the first voltage of the first power supply terminal VGH to the fifth node P5 in response to the control of the signal of the first clock signal terminal CKA, and to provide the signal of the first clock signal terminal CKA to the fifth node P5 in response to control of the voltage at the fourth node P4. Optionally, the second input sub-module 102 may include a thirty-second switching transistor T32 and a thirty-third switching transistor T33. A gate of the thirty-second switching transistor T32 is electrically connected with the first clock signal terminal CKA, a first pole of the thirty-second switching transistor T32 is electrically connected with the first power supply terminal VGH, and a second pole of the thirty-second switching transistor T32 is electrically connected with the fifth node P5. A gate of the twelfth switching transistor T33 is electrically connected with the fourth node P4, a first pole of the thirty-third switching transistor T33 is electrically connected with the first clock signal terminal CKA, and a second pole of the thirty-third switching transistor T33 is electrically connected with the fifth node P5.

The first voltage control sub-module 103 is connected with the first node P1, the second node P2, the fourth node P4, the fifth node P5, the second clock signal terminal CKB, the first power supply terminal VGH and the second power supply terminal VGL. The first voltage control sub-module 103 is configured to provide the signal of the second clock signal terminal CKB to the first node P1 in response to the control of the voltage at the fifth node P5 and the signal of the second clock signal terminal CKB, and to provide the voltage at the fourth node P4 to the sixth node P6 in response to the control of the voltage at the fourth node P4 and the first power supply terminal VGH, to supply the voltage at the sixth node P6 to the second node P2 in response to the control of the first power supply terminal VGH, to supply the first voltage at the first power supply terminal VGH to the sixth node P6 in response to the control of the voltage at the second node P2, and to supply the second voltage at the second power supply terminal VGL to the first node P1 in response to the control of the voltage at the second node P2. Optionally, the first voltage control sub-module 103 may include a thirty-fourth switching transistor T34, a thirty-fifth switching transistor T35, a thirty-sixth switching transistor T36, a thirty-seventh switching transistor T37, a thirty-eighth switching transistor T38, a thirty-ninth switching transistor T39 and a sixth capacitor C6. A gate of the thirty-fourth switching transistor T34 is electrically connected with the fifth node P5, a first pole of the thirty-fourth switching transistor T34 is electrically connected with the second clock signal terminal CKB, and a second pole of the thirty-fourth switching transistor T34 is electrically connected with the seventh node P7. A gate of the thirty-fifth switching transistor T35 is electrically connected with the second clock signal terminal CKB, a first pole of the thirty-fifth switching transistor T35 is electrically connected with the seventh node P7, and a second pole of the thirty-fifth switching transistor T35 is electrically connected with the first node P1. A gate of the thirty-sixth switching transistor T36 is electrically connected to the second node P2, a first pole of the thirty-sixth switching transistor T36 is electrically connected with the second power supply terminal VGL, and a second pole of the thirty-sixth switching transistor T36 is electrically connected with the first node P1. A gate of the thirty-seventh switching transistor T37 is electrically connected with the second node P2, a first pole of the thirty-seventh switching transistor T37 is electrically connected with the first power supply terminal VGH, and a second pole of the thirty-seventh switching transistor T37 is electrically connected with the sixth node P6. A gate of the thirty-eighth switching transistor T38 is electrically connected with the first power supply terminal VGH, a first pole of the thirty-eighth switching transistor T38 is electrically connected to the fourth node P4, and a second pole of the thirty-eighth switching transistor T38 is electrically connected to the sixth node P6. A gate of the thirty-ninth switching transistor T39 is electrically connected to the first power supply terminal VGH, a first pole of the thirty-ninth switching transistor T39 is electrically connected with the sixth node P6, and a second pole of the thirty-ninth switching transistor T39 is electrically connected to the second node P2. A first terminal of the sixth capacitor C6 is electrically connected with the fifth node P5, and a second end of the sixth capacitor C6 is electrically connected with the seventh node P7.

The second voltage control sub-module 104 is connected with the fourth node P4, the fifth node P5, the second clock signal terminal CKB, and the second power supply terminal VGL, and the second voltage control sub-module 104 is configured to provide a second voltage of the second power supply terminal VGL to the fourth node P4 in response to the control of the voltage at the fifth node P5 and the signal of the second clock signal terminal CKB. Optionally, the second voltage control sub-module 104 may include a fortieth switching transistor T40 and a forty-first switching transistor T41. A gate of the fortieth switching transistor T40 is electrically connected with the fifth node P5, a first pole of the fortieth switching transistor T40 is electrically connected with the second power supply terminal VGL, and a second pole of the fortieth switching transistor T40 is electrically connected with a first pole of the forty-first switching transistor T41. A gate of the forty-first switching transistor T41 is electrically connected with the second clock signal terminal CKB, and a second pole of the forty-first switching transistor T41 is electrically connected with the fourth node P4.

In some embodiments, in the above-mentioned first shift register according to the embodiments of the present disclosure, as shown in FIG. 10, a reset module 50 may also be included. The reset module 50 is connected with a reset signal terminal TRST, the first power supply terminal VGH and the fourth node P4, and the reset module 50 is configured to provide the first voltage of the first power supply terminal VGH to the fourth node P4 in response to control of a signal of the reset signal terminal TRST. Optionally, the reset module 50 may include a forty-second switching transistor T42 whose gate is electrically connected to the reset signal terminal TRST, a first pole of the forty-second switching transistor T42 is electrically connected to the first power supply terminal VGH, and a second pole of the forty-second switching transistor T42 is electrically connected to the fourth node P4.

In some embodiments, in order to unify the fabrication process, in the above-mentioned first shift register according to the embodiments of the present disclosure, as shown in FIG. 10, all of the eighteenth switching transistor T18 to the forty-second switching transistor T42 may be N-type transistors.

Figure 11:
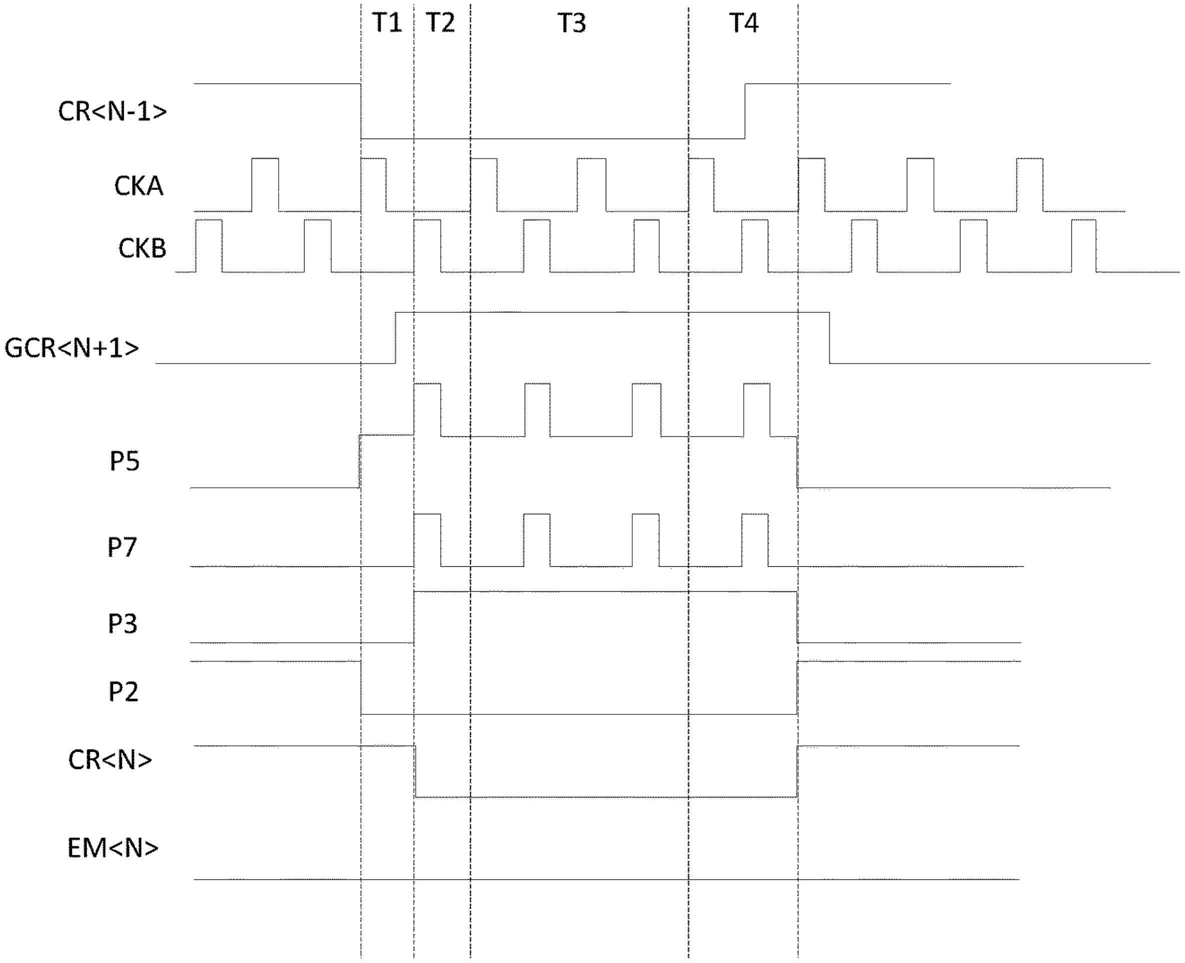
FIG. 11 is a timing diagram illustrating working of the first shift register shown in FIG. 10.

FIG. 11 is a timing diagram illustrating working of the first shift register shown in FIG. 10. As shown in FIG. 11, the first voltage supplied by the first power supply terminal VGH is a high level voltage, and the second voltage supplied by the second power supply terminal VGL is a low level voltage. The process of the first shift register outputting the light emitting control drive signal through the light emitting control drive signal output terminal EM<N> and outputting the light emitting cascade signal through the light emitting cascade signal output terminal CR<N> is described in detail below. The process of outputting the light emitting control drive signal and outputting the light emitting cascade signal by the first shift register shown in FIG. 11 includes a first stage T1, a second stage T2, a third stage T3 and a fourth stage T4.

In the first stage T1, the preceding stage light emitting cascade signal output terminal CR<N−1> provides a low level signal, the subsequent stage gate cascade signal output terminal GCR<N+1> provides a low level signal, the first clock signal terminal CKA provides a high level signal, and the second clock signal terminal CKB provides a low level signal. The thirty-first switching transistor T31 and the thirty-second switching transistor T32 are both turned on, the forty-first switching transistor T41 is turned off, the fourth node P4 turns to a low potential, the thirty-third switching transistor T33 is turned off, the fifth node P5 turns to a high potential, both of the thirty-fourth switching transistor T34 and the fortieth switching transistor T40 are turned on, the seventh node P7 turns to a low potential, the thirty-fifth switching transistor T35 is turned off, both of the thirty-eighth switching transistor T38 and the thirty-ninth switching transistor T39 are turned on, the second node P2 turns to a low potential, all of the thirty-sixth switching transistor T36, the thirty-seventh switching transistor T37 and the twenty-third switching transistor T23 are turned off, all of the eighteenth switching transistor T18, the nineteenth switching transistor T19, the twentieth switching transistor T20, the twenty-first switching transistor T21, the twenty-second switching transistor T22 and the twenty-fourth switching transistor T24 are turned off, the twenty-third switching transistor T23 and the thirtieth switching transistor T30 are turned on due to a bootstrap action of the fifth capacitor P5, CR<N> outputs a high level signal, P1 is at a low level, both of the twenty-seventh switching transistor 27 and the twenty-eighth switching transistor T28 are turned off, the twenty-fifth switching transistor T25 is turned on, and the twenty-sixth switching transistor T26 is turned on. However, an aspect ratio of the twenty-fifth switching transistor T25 is greater than an aspect ratio of the twenty-sixth switching transistor T26, then the light emitting control drive signal output terminal EM<N> outputs a low level.

In the second stage T2, the preceding stage light emitting cascade signal output terminal CR<N−1> provides a low level signal, the subsequent stage gate cascade signal output terminal GCR<N+1> provides a high level signal, the first clock signal terminal CKA provides a low level signal, and the second clock signal terminal CKB provides a high level signal. Both of the thirty-first switching transistor T31 and the thirty-second switching transistor T32 are turned off, the forty-first switching transistor T41 is turned on, the fifth node P5 is further pulled up due to a bootstrap action of the sixth capacitor P6, all of the thirty-fourth switching transistor T34, the thirty-fifth switching transistor T35 and the fortieth switching transistor T40 are turned on, the first node P1 turns to a high potential, both of the twenty-seventh switching transistor T27 and the twenty-eighth switching transistor T28 are turned on, CR<N> outputs a low level signal, the eighteenth switching transistor T18 is turned on, the nineteenth switching transistor T19 is turned off, the twentieth switching transistor T20 is turned on, the twenty-fourth switching transistor T24 is turned on, the twenty-fifth switching transistor T25 is turned on, and the light emitting control drive signal output terminal EM<N> outputs a low level.

The third stage T3 includes a first stage T1 and a second stage T2 which are alternately arranged, so that the light emitting control drive signal output terminal EM<N> still outputs a low level in the third stage T3.

Timing in the fourth stage T4 is also the same as timing in the first stage T1 and timing in the second stage T2, so that the light emitting control drive signal output terminal EM<N> still outputs a low level in the fourth stage T4.

Therefore, the first shift register, as shown in FIG. 10, which is provided in the embodiment of the present disclosure can ensure that EM<N> constantly outputs a low level signal (i.e. active level signal). Compared with receiving a black insertion drive signal in the blank period and needs to perform the external compensation sensing in the blank period in the past, the row of pixel unit actually receives a light emitting drive signal in the blank period, thus the external compensation sensing process of the row of pixel units can be ensured.

Figure 12:
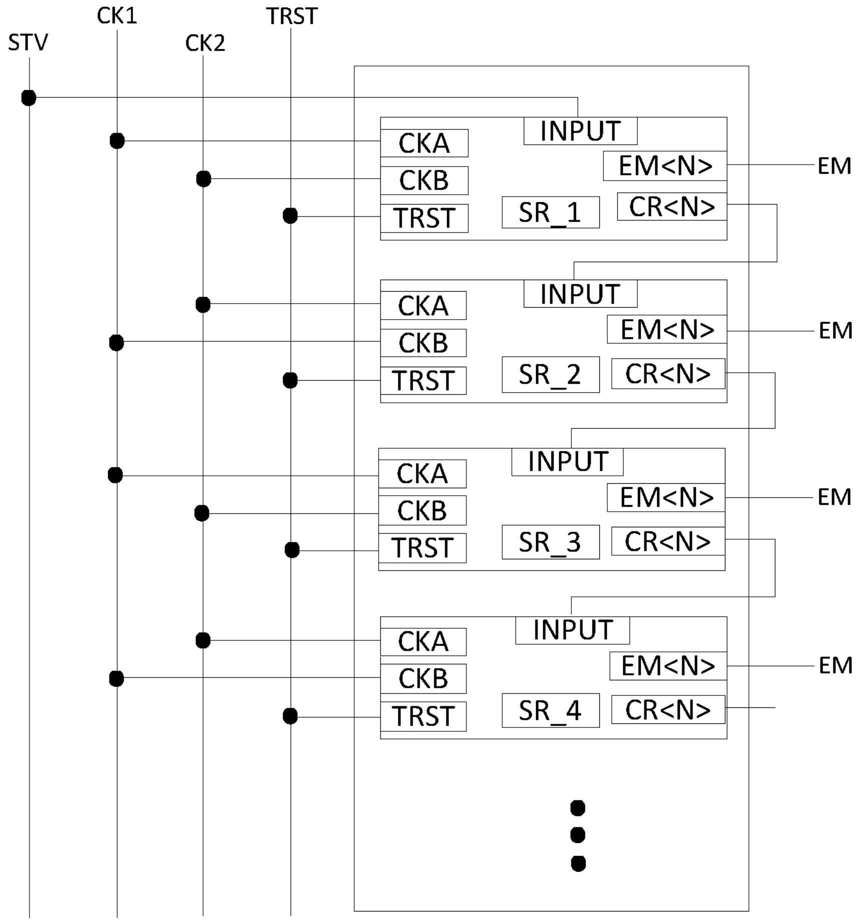
FIG. 12 is a schematic diagram of a circuit structure of a gate drive circuit according to an embodiment of the present disclosure.

Based on the same inventive concept, a gate drive circuit 100 is also provided in an embodiment of the present disclosure. As shown in FIG. 12, the gate drive circuit 100 includes a plurality of cascaded first shift registers (SR_1, SR 2, SR_3 . . . ), wherein the first shift register is the first shift register according to any one of the embodiments of the present disclosure.

A signal input terminal INPUT of the first shift register SR_1 located in a first stage is connected with a light emitting start signal line STV, and signal input terminals INPUT of first shift registers (SR 2, SR_3 . . . ) located in the other stages except the first stage are connected with a light emitting cascade signal output terminal CR<N> of first shift registers in a respective preceding stage.

A light emitting control drive signal output terminal EM<N> of each first shift register (SR_1, SR 2, SR_3 . . . ) is electrically connected with a corresponding light emitting control signal line EM.

In some embodiments, a first clock signal line CK1 and a second clock signal line CK2 are configured for the first gate drive circuit. In the first gate drive circuit, a first clock signal terminal CKA of a first shift register located in an odd stage is connected with a first clock signal line CK1, a second clock signal terminal CKB of the first shift register located in the odd stage is connected with a second clock signal line CK2, a first clock signal terminal CKA of a first shift register located in an even stage is connected with the second clock signal line CK2, and a second clock signal terminal CKB of the first shift register located in the even stage is connected with the first clock signal line CK1.

When a light emitting global reset circuit is arranged in the first shift register in the first gate drive circuit, the first gate drive circuit is also provided with a light emitting global reset signal line Reset, and the light emitting global reset signal terminal TRST provided in the first shift registers in each stage is connected with a same light emitting global reset signal line Reset.

Figure 13:
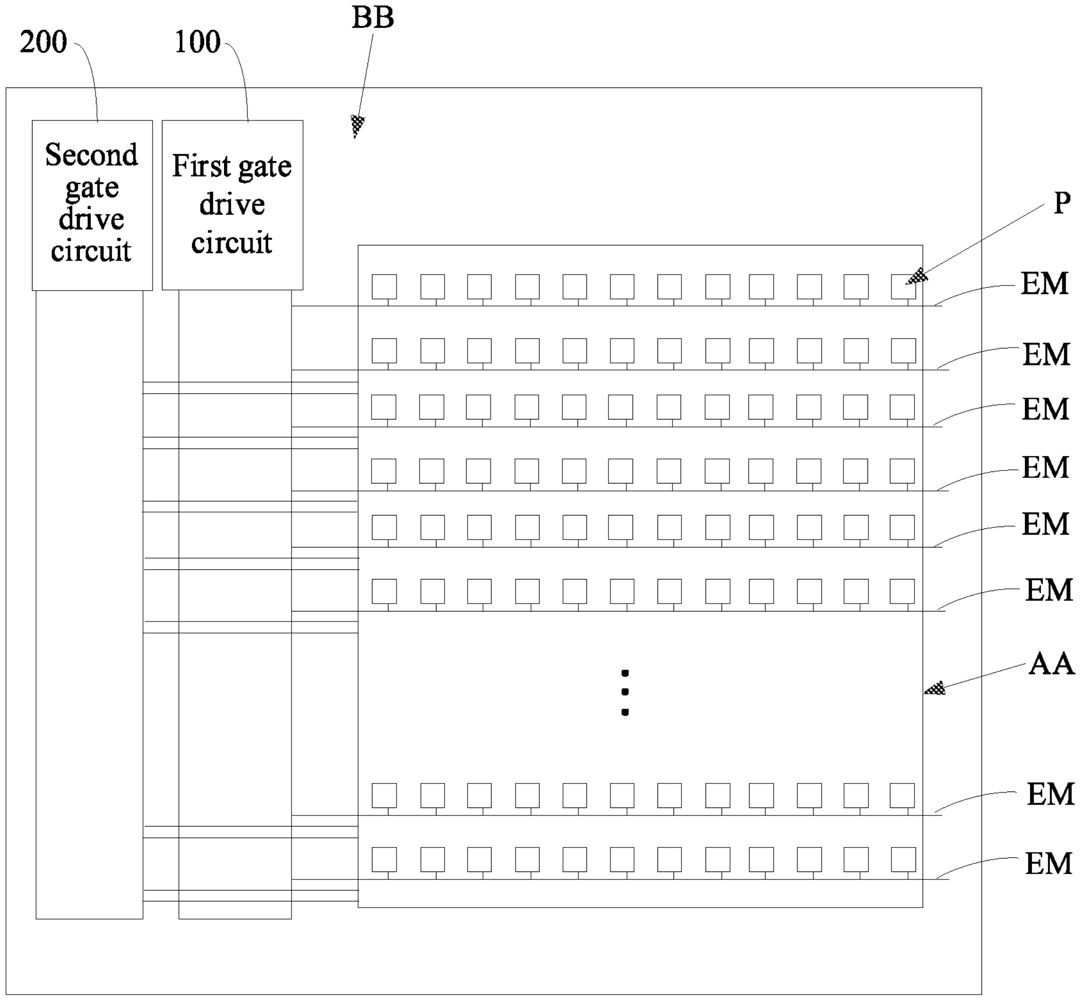
FIG. 13 is a schematic diagram of a structure of a display device according to an embodiment of the present disclosure.

Based on the same inventive concept, a display device is also provided in an embodiment of the present disclosure. As shown in FIG. 13, the display device includes a display region AA and a peripheral region BB located around the display region AA, wherein the display region AA includes a plurality of pixel units P arranged in an array, each row of pixel units P is provided with a corresponding light emitting control signal line EM, the light emitting control signal line EM is connected with a gate of a light emitting control transistor in a corresponding pixel unit P. In the embodiment of the present disclosure, the pixel unit P in FIG. 13 may have an 4T1C structure shown in FIG. 14, and a light emitting control transistor T4' is a P-type transistor, so that when the light emitting control signal line EM is at low level, the light emitting control transistor T4' can be opened completely, thereby ensuring ELVDD is output completely.

The peripheral region BB includes a first gate drive circuit for providing a light emitting control signal to the light emitting control signal line EM, wherein the first gate drive circuit is the above-mentioned gate drive circuit 100.

Figure 14:
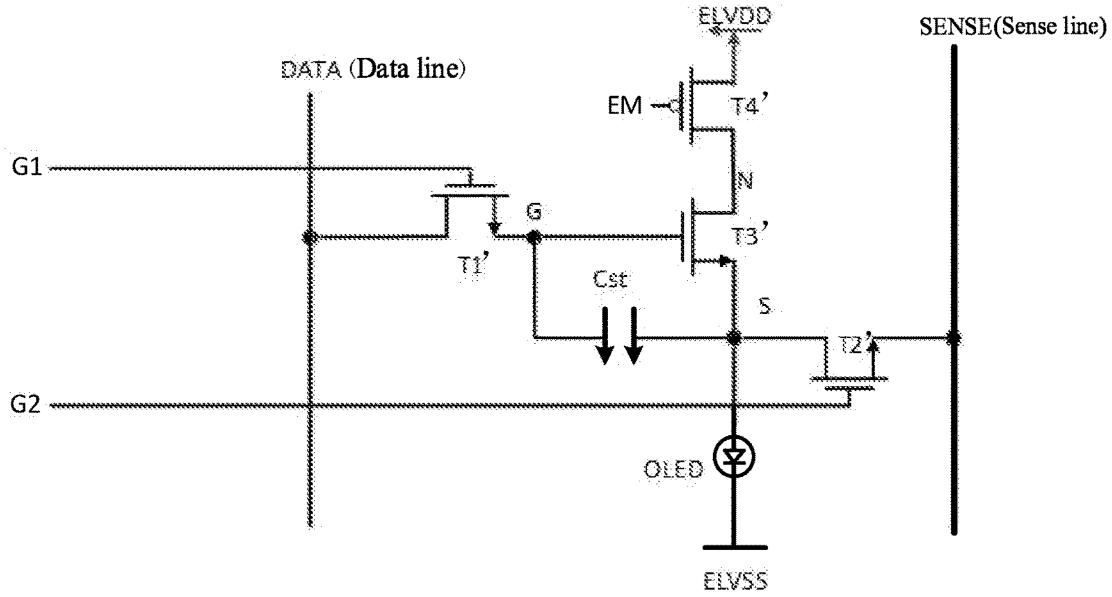
FIG. 14 is a schematic diagram of a circuit structure of a pixel unit in a display substrate according to an embodiment of the present disclosure.

In some embodiments, as shown in FIG. 14, each row of pixel units P is further configured with a corresponding first gate line G1 connected to a gate of a data writing transistor T1' in a corresponding pixel unit, and a second gate line G2 connected to a gate of a sensing transistor T2' in the corresponding pixel unit P, and the row of pixel units P further includes a driving transistor T3'.

Figure 15:
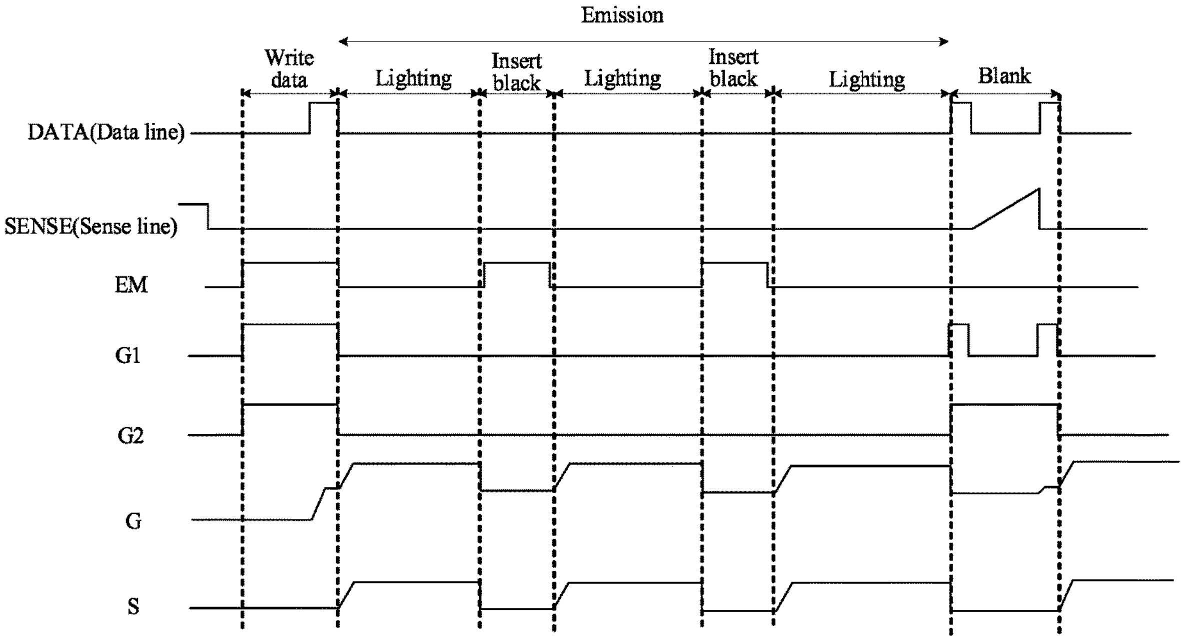
FIG. 15 is a timing diagram illustrating working of the pixel circuit shown in FIG. 14.
Figure 16:
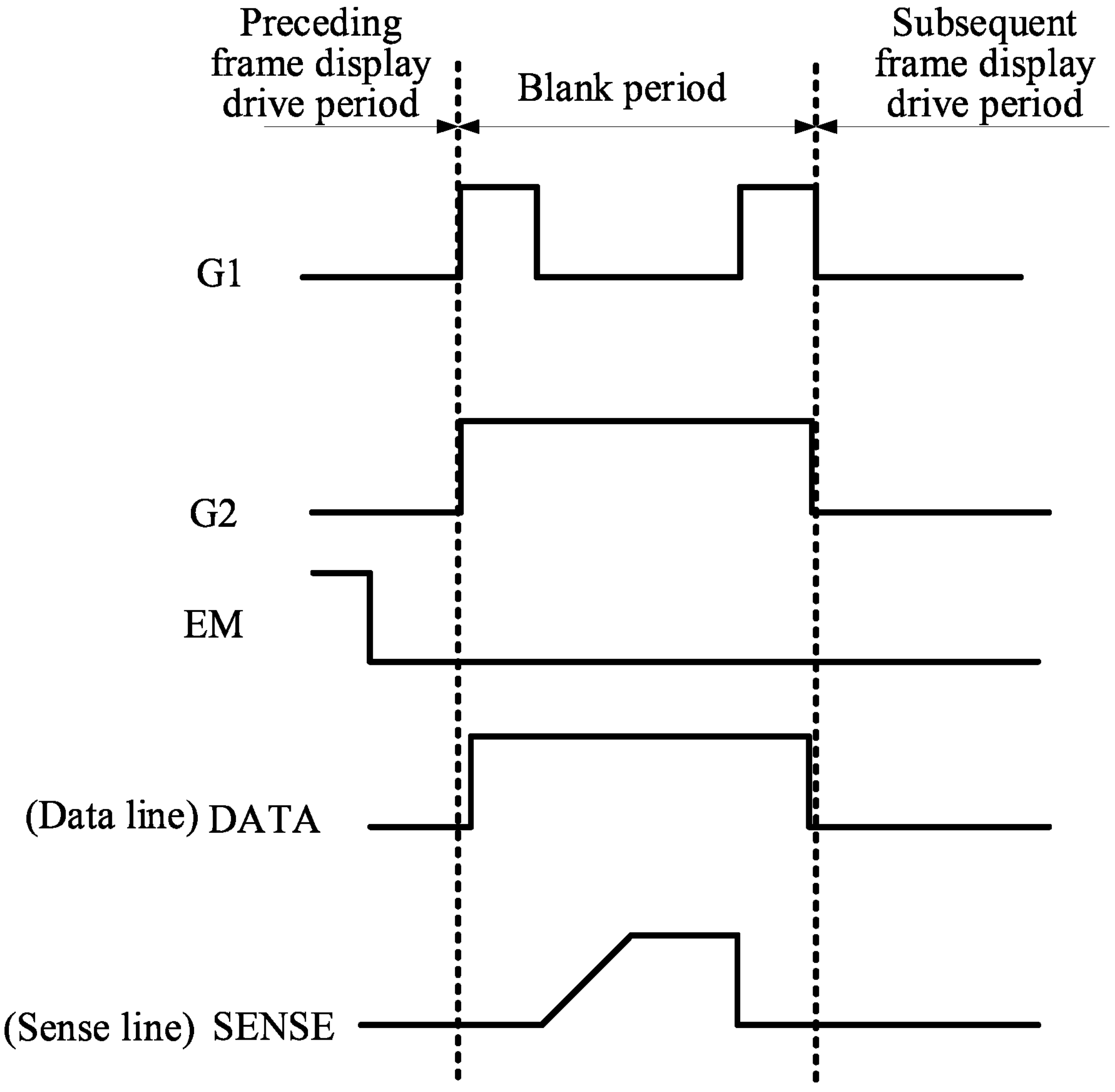
FIG. 16 is a timing diagram illustrating working of the pixel unit shown in FIG. 14 performing external compensation sensing in a blank period.

As shown in FIGS. 15 and 16, FIG. 15 is a timing diagram illustrating the 4T1C structure corresponding to FIG. 14, and FIG. 16 is a timing diagram illustrating a blank period in FIG. 14. It can be seen that EM<N> constantly outputs a low level signal (i.e. active level signal). Compared with receiving a black insertion drive signal in the blank period and needs to perform the external compensation sensing in the blank period in the past, the row of pixel unit actually receives a light emitting drive signal in the blank period, thus the external compensation sensing process of the row of pixel units can be ensured.

Figure 17:
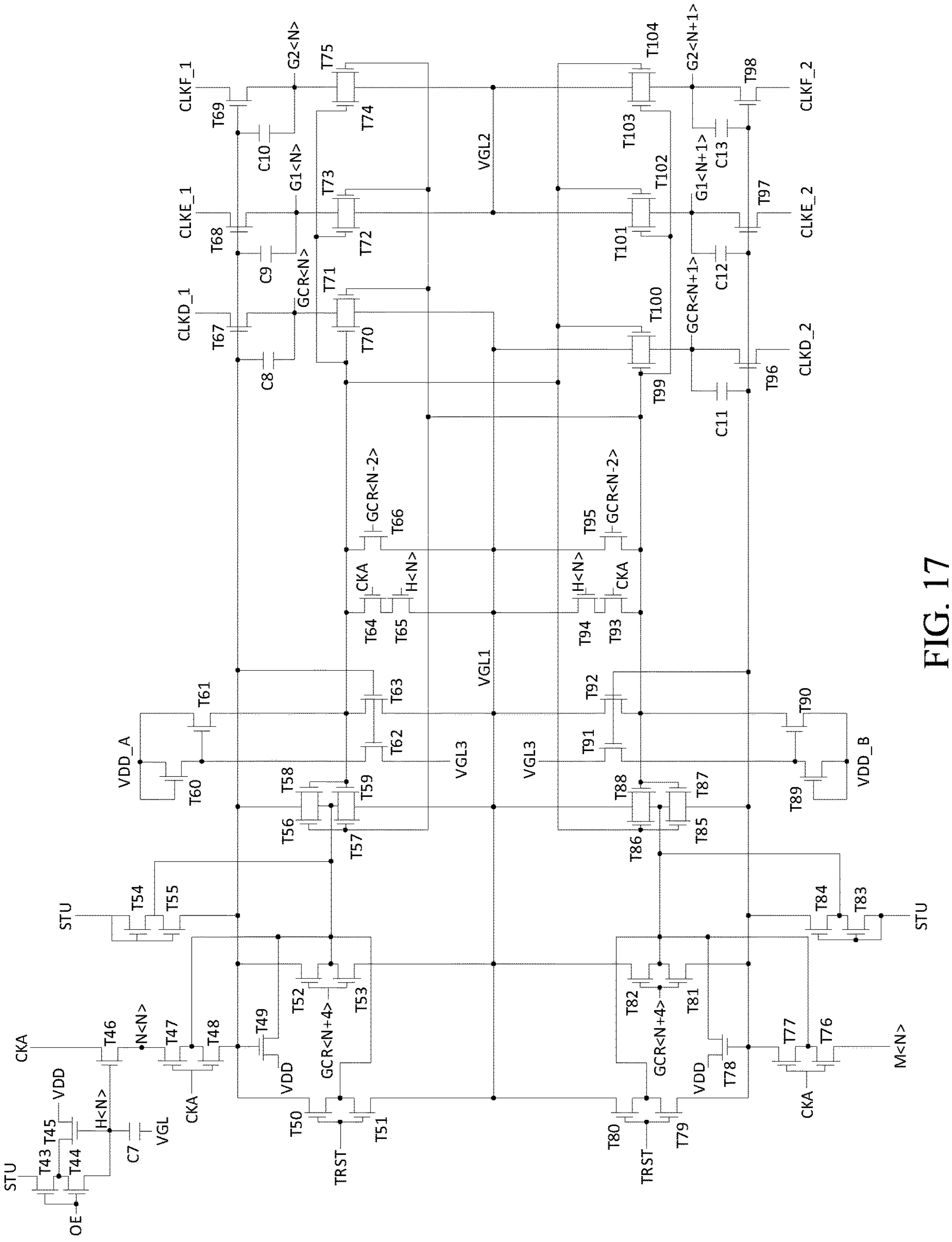
FIG. 17 is a schematic diagram of a circuit structure of a second shift register according to an embodiment of the present disclosure.
Figure 18:
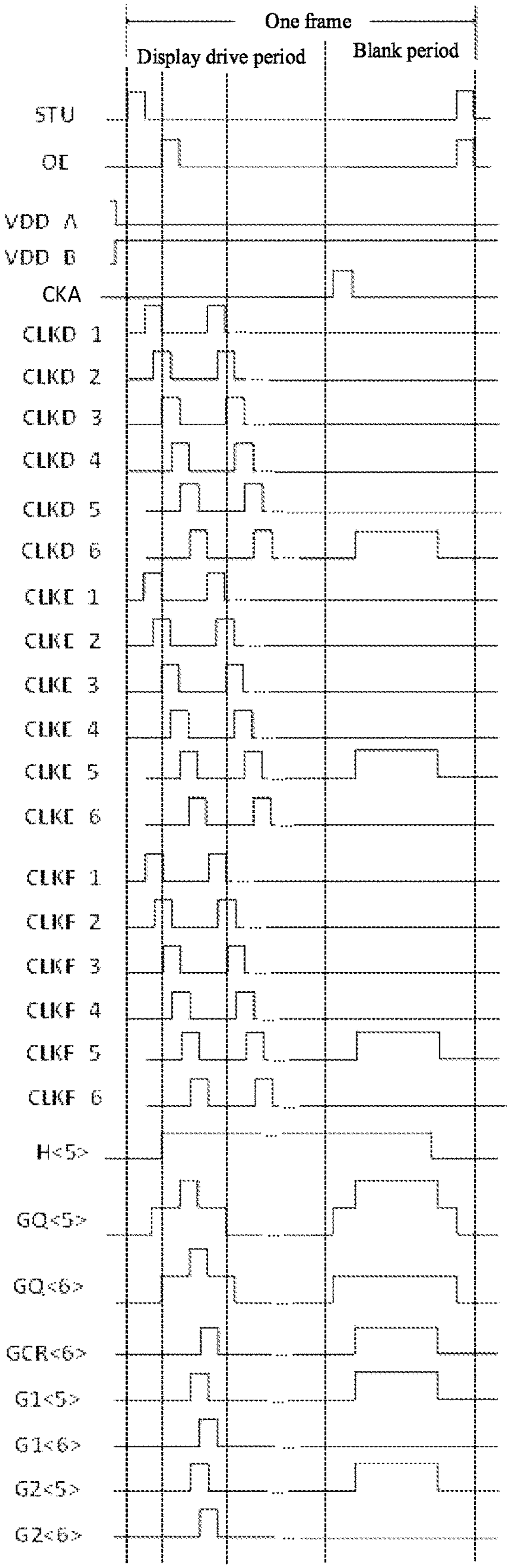
FIG. 18 is a timing diagram illustrating working of the second shift register shown in FIG. 17.

As shown in FIG. 13, the peripheral region BB further includes a second gate drive circuit 200. The second gate drive circuit 200 includes a plurality of cascaded second shift registers. As shown in FIG. 17, which illustrates a schematic diagram of a circuit structure of the two second shift registers cascaded. FIG. 18 is a timing diagram illustrating working corresponding to FIG. 17, and FIG. 17 illustrates the forty-third switching transistor T43 to a one hundred and fourth switching transistor and a seventh capacitor C7 to a thirteenth capacitor C13. The second shift register is configured with a first gate cascade signal output terminal G1<N>, a second gate cascade signal output terminal G2<N> and a third gate cascade signal output terminal GCR<N+1>. The first gate cascade signal output terminal G1<N> is connected with a corresponding first gate line G1 in a corresponding pixel circuit shown in FIG. 13, the second gate cascade signal output terminal G2<N> is connected with a corresponding second gate line G2 in the corresponding pixel circuit shown in FIG. 13, and the third gate cascade signal output terminal is the subsequent stage gate cascade signal output terminal GCR<N+1> in the first shift register.

Figure 19:
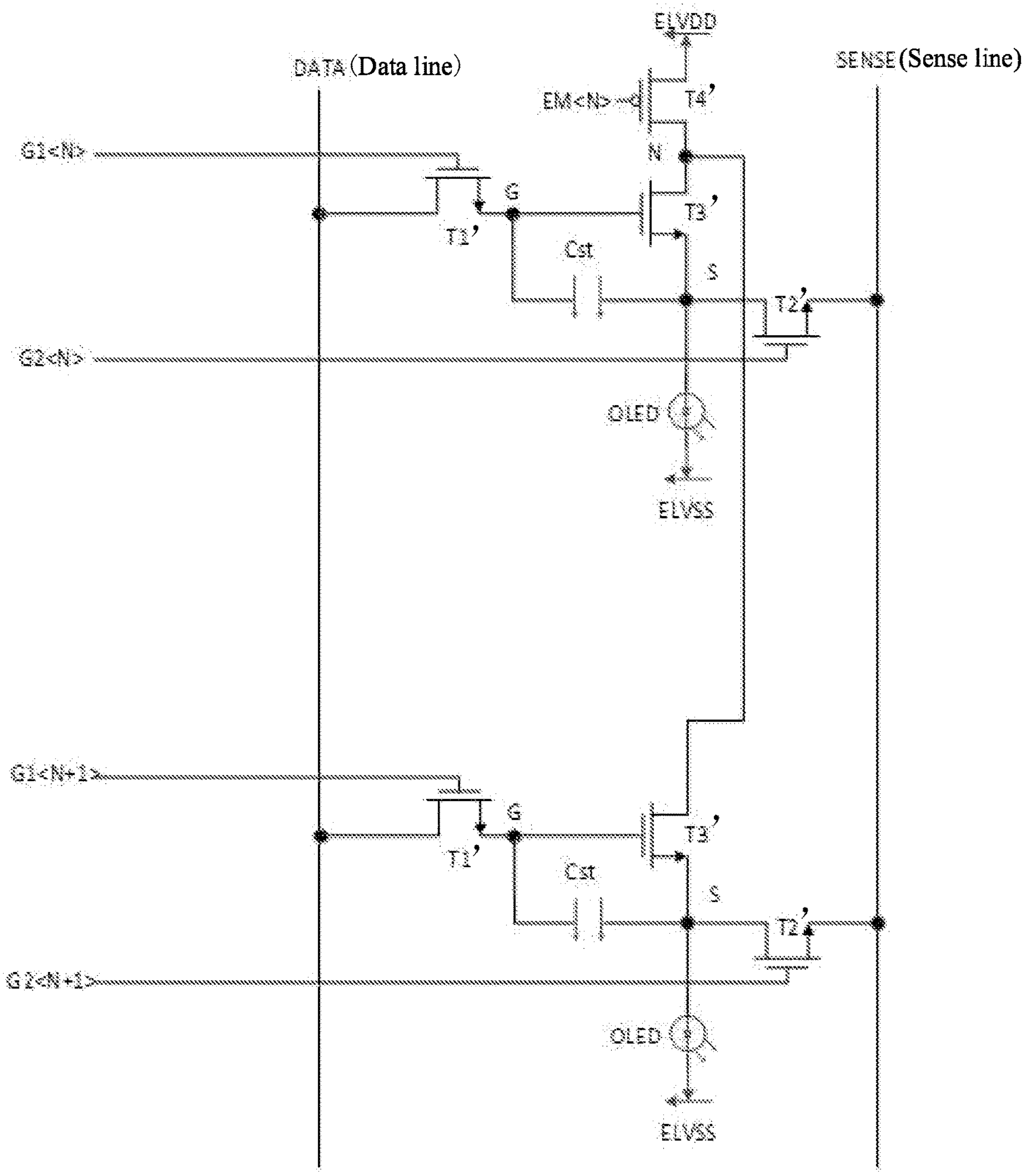
FIG. 19 is a schematic diagram of a circuit structure of a same light emitting control transistor shared with two pixel units located in adjacent rows in an embodiment of the present disclosure.

FIG. 19 is a schematic diagram of a circuit structure of a same light emitting control transistor shared with two pixel units located in adjacent rows in an embodiment of the present disclosure. As shown in FIG. 19, in the embodiment of the present disclosure, each pixel unit P may include an independent light emitting control transistor ETFT, and two pixel units located in adjacent rows may also share the same light emitting control transistor ETFT. By the design of the shared light emitting control transistor ETFT, a quantity of transistors in the display region can be effectively reduced, and a quantity of the first shift registers in the first gate drive circuit 100 can be effectively reduced, too. Specifically, the quantity of the first shift registers in the first gate drive circuit 100 can be halved by sharing the same light emitting control transistor T4' with two pixel units in adjacent rows, compared with a scheme in which each pixel unit may include an independent light emitting control transistor T4'.

Of course, the pixel unit in the embodiments of the present disclosure may also have other circuit configurations, which are not exemplified for specific cases.

Since the principle for solving problems of the display device is similar to the principle for solving problems of any display panel described above, the implementations of the touch display panel described above may be referred to for the implementations of the display device, and repetitions will not be repeated. The display device may be any product or component with a display function, such as a flexible wearable device, a mobile phone, a tablet computer, a television, a display, a laptop computer, a digital photo frame, a navigator and the like. An implementation of the display device can refer to an embodiment of the display panel described above, and repetitions will not be repeated.

The embodiments of the present disclosure provide a shift register, a gate drive circuit and a display device. When a row of pixel unit needs to perform external compensation sensing and the row of pixel unit receives a black insertion drive signal (i.e. inactive level signal) in a blank period if a conventional light emitting gate drive circuit is used for driving, in the embodiment of the present disclosure, a light emitting control drive signal output terminal of a first shift register corresponding to the row of pixel units which needs to perform the external compensation sensing can be controlled to forcibly output the light emitting drive signal (i.e. active level signal) through the subsequent stage gate cascade signal output terminal connected to the first shift register corresponding to the row of pixel units which performs the external compensation sensing, so that the light emitting signal received by the row of pixel units which needs to perform the external compensation sensing in the blank period is the light emitting drive signal. In other words, the row of pixel units that originally received the black insertion drive signal in the blank period and needed to perform the external compensation sensing in the blank period, actually receives the light emitting drive signal in the blank period, thus ensuring the external compensation sensing process of the row of pixel units.

Although preferred embodiments of the present disclosure have been described, those skilled in the art may make additional changes and modifications to these embodiments once underlying inventive concepts are known. Therefore, the appended claims are intended to be interpreted to encompass preferred embodiments as well as all changes and modifications falling within the scope of the present disclosure.

Apparently, various modifications and variations to the embodiments of the present disclosure may be made by those skilled in the art without departing from the spirit and scope of the embodiments of the present disclosure. Thus, if these modifications and variations to the embodiments of the present disclosure fall within the scope of the claims of the present disclosure and their equivalent techniques, the present disclosure is intended to include these modifications and variations.

The invention claimed is:

1. A shift register comprising:

a voltage regulating module that is connected with a preceding stage light emitting cascade signal output terminal, a first clock signal terminal, a second clock signal terminal, a first power supply terminal, a second power supply terminal, a first node and a second node, wherein the voltage regulating module is configured to adjust voltages at the first node and the second node in response to control of signals provided by the preceding stage light emitting cascade signal output terminal, the first clock signal terminal, the second clock signal terminal, the first power supply terminal and the second power supply terminal;

a light emitting cascade output module that is connected with the first power supply terminal, the second power supply terminal, a light emitting cascade signal output terminal, the first node, and the second node, wherein the light emitting cascade output module is configured to supply a first voltage of the first power supply terminal or a second voltage of the second power supply terminal to the light emitting cascade signal output terminal in response to control of the voltage at the first node and in response to control of the voltage at the second node;

a node control module that is connected with the first node, a subsequent stage gate cascade signal output terminal, the second power supply terminal, a third node, and the second clock signal terminal, wherein the node control module is configured to adjust a voltage at the third node in response to control of signals provided by the subsequent stage gate cascade signal output terminal, the first node, and the second clock signal terminal; and a light emitting drive output module that is connected to the second node and connected to the third node, the first power supply terminal, the second power supply terminal, and a light emitting control drive signal output terminal, wherein the light emitting drive output module is configured to supply the first voltage of the first power supply terminal to a light emitting control drive signal output terminal in response to control of the voltage at the third node, to supply the second voltage of the second power supply terminal to the light emitting control drive signal output terminal in response to the control of the voltage at the second node, and to supply the second voltage of the second power supply terminal to the light emitting control drive signal output terminal in response to the control of the voltage at the second node;

or, a light emitting drive output module that is connected with the second node, the third node, the first power supply terminal, the second power supply terminal, the subsequent stage gate cascade signal output terminal and the light emitting control drive signal output terminal, wherein the light emitting drive output module is configured to supply the first voltage of the first power supply terminal to the light emitting control drive signal output terminal in response to control of the voltage at the third node, and to supply the second voltage of the second power supply terminal to the light emitting control drive signal output terminal in response to the control of the voltage at the second node and control of the subsequent stage gate cascade signal output terminal.

2. The shift register of claim 1, wherein the node control module comprises an eighteenth switching transistor, a nineteenth switching transistor, a twentieth switching transistor, and a twenty-first switching transistor; wherein a gate of the eighteenth switching transistor is electrically connected with the subsequent stage gate cascade signal output terminal, a first pole of the eighteenth switching transistor is electrically connected with the second power supply terminal, and a second pole of the eighteenth switching transistor is electrically connected with a gate of the nineteenth switching transistor;

a first pole of the nineteenth switching transistor is electrically connected with the first node, and a second pole of the nineteenth switching transistor is electrically connected with the third node;

a gate of the twentieth switching transistor is electrically connected with the subsequent stage gate cascade signal output terminal, a first pole of the twentieth switching transistor is electrically connected with the second power supply terminal, and a second pole of the twentieth switching transistor is electrically connected with the third node;

both of a gate and a first pole of the twenty-first switching transistor are electrically connected with the second clock signal terminal, and a second pole of the twenty-first switching transistor is electrically connected with the second pole of the eighteenth switching transistor.

3. The shift register of claim 2, wherein the light emitting drive output module comprises a twenty-second switching transistor, a twenty-third switching transistor, a twenty-fourth switching transistor, a twenty-fifth switching transistor, and a twenty-sixth switching transistor; wherein a gate of the twenty-second switching transistor is electrically connected with the third node, a first pole of the twenty-second switching transistor is electrically connected with the second power supply terminal, and a second pole of the twenty-second switching transistor is electrically connected with a gate of the twenty-fifth switching transistor;

a gate of the twenty-third switching transistor is electrically connected with the second node, a first pole of the twenty-third switching transistor is electrically connected with the first power supply terminal, and a second pole of the twenty-third switching transistor is electrically connected to the gate of the twenty-fifth switching transistor;

a gate of the twenty-fourth switching transistor is electrically connected with the subsequent stage gate cascade signal output terminal, a first pole of the twenty-fourth switching transistor is electrically connected with the first power supply terminal, and a second pole of the twenty-fourth switching transistor is electrically connected with the gate of the twenty-fifth switching transistor;

a first pole of the twenty-fifth switching transistor is electrically connected with the second power supply terminal, and a second pole of the twenty-fifth switching transistor is electrically connected with the light emitting control drive signal output terminal;

both of a gate and a first pole of the twenty-sixth switching transistor is electrically connected with the first power supply terminal, a second pole of the twenty-sixth switching transistor is electrically connected with the light emitting control drive signal output terminal.

4. The shift register of claim 3, wherein the light emitting cascade output module comprises a twenty-seventh switching transistor, a twenty-eighth switching transistor, a twenty-ninth switching transistor, a fourth capacitor, a thirtieth switching transistor, and a fifth capacitor; wherein a gate of the twenty-seventh switching transistor is electrically connected with the first node, a first pole of the twenty-seventh switching transistor is electrically connected with the second power supply terminal, and a second pole of the twenty-seventh switching transistor is electrically connected with a first pole of the twenty-eighth switching transistor;

a gate of the twenty-eighth switching transistor is electrically connected with the first node, and a second pole of the twenty-eighth switching transistor is electrically connected with the light emitting cascade signal output terminal;

a gate of the twenty-ninth switching transistor is electrically connected with the light emitting cascade signal output terminal, a first pole of the twenty-ninth switching transistor is electrically connected with the first power supply terminal, and a second pole of the twenty-ninth switching transistor is electrically connected with the first pole of the twenty-eighth switching transistor;

a first terminal of the fourth capacitor is connected with the first node, and a second terminal of the fourth capacitor is connected with the second power supply terminal;

a gate of the thirtieth switching transistor is electrically connected with the second node, a first pole of the thirtieth switching transistor is electrically connected with the first power supply terminal, and a second pole of the thirtieth switching transistor is electrically connected to the light emitting cascade signal output terminal;

a first terminal of the fifth capacitor is electrically connected with the second node, and a second terminal of the fifth capacitor is electrically connected with the light emitting cascade signal output terminal.

5. The shift register of claim 4, wherein the voltage regulating module comprises:

a first input sub-module that is connected to the preceding stage light emitting cascade signal output terminal, the first clock signal terminal, and the fourth node, wherein the first input sub-module is configured to provide a signal from the preceding stage light emitting cascade signal output terminal to the fourth node in response to control of a signal of the first clock signal terminal;

a second input sub-module that is connected to the first clock signal terminal, the first power supply terminal, the fourth node and the fifth node, wherein the second input sub-module is configured to provide the first voltage of the first power supply terminal to the fifth node in response to the control of the signal of the first clock signal terminal, and to provide the signal of the first clock signal terminal to the fifth node in response to control of a voltage at the fourth node;

a first voltage control sub-module that is connected to the first node, the second node, the fourth node, the fifth node, the second clock signal terminal, the first power supply terminal and the second power supply terminal, wherein the first voltage control sub-module is configured to provide the signal of the second clock signal terminal to the first node in response to control of a voltage at the fifth node and the signal of the second clock signal terminal, to supply a voltage at the fourth node to the sixth node in response to control of the voltage at the fourth node and the first power supply terminal, to supply a voltage at the sixth node to the second node in response to control of the first power supply terminal, to provide the first voltage of the first power supply terminal to the sixth node in response to control of the voltage at the second node, and to provide the second voltage of the second power supply terminal to the first node in response to the control of the voltage at the second node; and a second voltage control sub-module that is connected to the fourth node, the fifth node, the second clock signal terminal and the second power supply terminal, wherein the second voltage control sub-module is configured to provide the second voltage of the second power supply terminal to the fourth node in response to control of a voltage at the fifth node and the signal of the second clock signal terminal.

6. The shift register of claim 5, wherein the first input sub-module comprises a thirty-first switching transistor, wherein a gate of the thirty-first switching transistor is electrically connected to the first clock signal terminal, a first pole of the thirty-first switching transistor is electrically connected to the preceding stage light emitting cascade signal output terminal, and a second pole of the thirty-first switching transistor is electrically connected to the fourth node;

the second input sub-module comprises a thirty-second switching transistor and a thirty-third switching transistor; wherein a gate of the thirty-second switching transistor is electrically connected with the first clock signal terminal, a first pole of the thirty-second switching transistor is electrically connected with the first power supply terminal, and a second pole of the thirty-second switching transistor is electrically connected with the fifth node; a gate of the thirty-third switching transistor is electrically connected with the fourth node, a first pole of the thirty-third switching transistor is electrically connected with the first clock signal terminal, and a second pole of the thirty-third switching transistor is electrically connected with the fifth node;

the first voltage control sub-module comprises a thirty-fourth switching transistor, a thirty-fifth switching transistor, a thirty-sixth switching transistor, a thirty-seventh switching transistor, a thirty-eighth switching transistor, a thirty-ninth switching transistor and a sixth capacitor; wherein a gate of the thirty-fourth switching transistor is electrically connected with the fifth node, a first pole of the thirty-fourth switching transistor is electrically connected with the second clock signal terminal, a second pole of the thirty-fourth switching transistor is electrically connected with the seventh node, a gate of the thirty-fifth switching transistor is electrically connected with the second clock signal terminal, a first pole of the thirty-fifth switching transistor is electrically connected with the seventh node, a second pole of the thirty-fifth switching transistor is electrically connected with the first node; a gate of the thirty-sixth switching transistor is electrically connected with the second node, a first pole of the thirty-sixth switching transistor is electrically connected with the second power supply terminal, and a second pole of the thirty-sixth switching transistor is electrically connected with the first node; a gate of the thirty-seventh switching transistor is electrically connected with the second node, a first pole of the thirty-seventh switching transistor is electrically connected with the first power supply terminal, and a second pole of the thirty-seventh switching transistor is electrically connected with the sixth node; a gate of the thirty-eighth switching transistor is electrically connected with the first power supply terminal, a first pole of the thirty-eighth switching transistor is electrically connected with the fourth node, and a second pole of the thirty-eighth switching transistor is electrically connected with the sixth node; a gate of the thirty-ninth switching transistor is electrically connected with the first power supply terminal, a first pole of the thirty-ninth switching transistor is electrically connected with the sixth node, and a second pole of the thirty-ninth switching transistor is electrically connected with the second node; a first terminal of the sixth capacitor is electrically connected with the fifth node, and a second terminal of the sixth capacitor is electrically connected with the seventh node;

the second voltage control sub-module comprises a fortieth switching transistor and a fortieth switching transistor; wherein a gate of the fortieth switching transistor is electrically connected to the fifth node, a first pole of the fortieth switching transistor is electrically connected to the second power supply terminal, a second pole of the fortieth switching transistor is electrically connected to a first pole of the forty-first switching transistor, a gate of the forty-first switching transistor is electrically connected to the second clock signal terminal, and a second pole of the forty-first switching transistor is electrically connected to the fourth node.

7. The shift register of claim 6, further comprising a reset module connected to a reset signal terminal, the first power terminal and the fourth node, wherein the reset module is configured to provide the first voltage of the first power terminal to the fourth node in response to control of a signal of the reset signal terminal.

8. The shift register of claim 7, wherein the reset module comprises a forty-second switching transistor, a gate of the forty-second switching transistor electrically connected to the reset signal terminal, a first pole of the forty-second switching transistor electrically connected to the first power supply terminal, and a second pole of the forty-second switching transistor electrically connected to the fourth node.

9. The shift register of claim 8, wherein all of the eighteenth switching transistor to the forty-second switching transistor are N-type transistors.

10. The shift register of claim 1, wherein the node control module comprises: a first switching transistor, a second switching transistor, a third switching transistor, and a fourth switching transistor; wherein a gate of the first switching transistor is electrically connected with the subsequent stage gate cascade signal output terminal, a first pole of the first switching transistor is electrically connected with a first node, and a second pole of the first switching transistor is electrically connected with a third node;

a gate of the second switching transistor is electrically connected with the second clock signal terminal, a first pole of the second switching transistor is electrically connected with the second power supply terminal, and a second pole of the second switching transistor is electrically connected with a gate of the third switching transistor;

a first pole of the third switching transistor is electrically connected with the first power supply terminal, and a second pole of the third switching transistor is electrically connected with the third node;

a gate of the fourth switching transistor is electrically connected with the subsequent stage gate cascade signal output terminal, a first pole of the fourth switching transistor is electrically connected with the first power supply terminal, and a second pole of the fourth switching transistor is electrically connected with the second pole of the second switching transistor.

11. The shift register of claim 10, wherein the light emitting drive output module comprises a fifth switching transistor, a sixth switching transistor, and a seventh switching transistor; wherein a gate of the fifth switching transistor is electrically connected with the third node, a first pole of the fifth switching transistor is electrically connected with the first power supply terminal, and a second pole of the fifth switching transistor is electrically connected with the light emitting control drive signal output terminal;

a gate of the sixth switching transistor is electrically connected to the second node, a first pole of the sixth switching transistor is electrically connected with the second power supply terminal, and a second pole of the sixth switching transistor is electrically connected with the light emitting control drive signal output terminal;

a gate of the seventh switching transistor is electrically connected with the second pole of the second switching transistor, a first pole of the seventh switching transistor is electrically connected with the second power supply terminal, and a second pole of the seventh switching transistor is electrically connected with the light emitting control drive signal output terminal.

12. The shift register of claim 11, wherein the light emitting cascade output module comprises an eighth switching transistor, a first capacitor, a ninth switching transistor, and a second capacitor; wherein a gate of the eighth switching transistor is electrically connected with the first node, a first pole of the eighth switching transistor is electrically connected with the first power supply terminal, and a second pole of the eighth switching transistor is electrically connected with the light emitting cascade signal output terminal;

a first terminal of the first capacitor is electrically connected between the first power supply terminal and the first pole of the eighth switching transistor, and a second terminal of the first capacitor is electrically connected with the gate of the eighth switching transistor;

a gate of the ninth switching transistor is electrically connected with the second node, a first pole of the ninth switching transistor is electrically connected with the second power supply terminal, and a second pole of the ninth switching transistor is electrically connected with the light emitting cascade signal output terminal;

a first terminal of the second capacitor is electrically connected with the second clock signal terminal, and a second terminal of the second capacitor is electrically connected with the second node.

13. The shift register of claim 12, wherein the voltage regulating module comprises:

a first input sub-module that is connected to the preceding stage light emitting cascade signal output terminal, the first clock signal terminal, and the second node, wherein the first input sub-module is configured to provide a signal from the preceding stage light emitting cascade signal output terminal to the second node in response to control of a signal of the first clock signal terminal;

a second input sub-module that is connected with the first clock signal terminal, the second power supply terminal, the second node, and a fourth node, wherein the second input sub-module is configured to supply the second voltage of the second power supply terminal to the fourth node in response to control of a signal at the first clock signal terminal, and to provide the signal of the first clock signal terminal to the fourth node in response to control of the voltage at the second node;

a first voltage control sub-module that is connected to the first node, the second node, the fourth node, the second clock signal terminal, and the first power supply terminal, wherein the first voltage control sub-module is configured to provide a signal of the second clock signal terminal to the first node in response to control of a voltage at the fourth node and the signal of the second clock signal terminal, and to provide a first voltage of the first power supply terminal to the first node in response to control of the voltage at the second node; and a second voltage control sub-module that is connected to the second node, the fourth node, the second clock signal terminal, and the first power supply terminal, wherein the second voltage control sub-module is configured to supply the first voltage of the first power supply terminal to the second node in response to the control of the voltage at the fourth node and the signal at the second clock signal terminal.

14. The shift register of claim 13, wherein the first input sub-module comprises a tenth switching transistor, a gate of the tenth switching transistor is electrically connected to the first clock signal terminal, a first pole of the tenth switching transistor is electrically connected to the preceding stage light emitting cascade signal output terminal, and a second pole of the tenth switching transistor is electrically connected to the second node;

the second input sub-module comprises an eleventh switching transistor and a twelfth switching transistor; wherein, a gate of the eleventh switching transistor is electrically connected with the first clock signal terminal, a first pole of the eleventh switching transistor is electrically connected with the second power supply terminal, and a second pole of the eleventh switching transistor is electrically connected with the fourth node; a gate of the twelfth switching transistor is electrically connected with the second node, a first pole of the twelfth switching transistor is electrically connected with the first clock signal terminal, and a second pole of the twelfth switching transistor is electrically connected with the fourth node;

the first voltage control sub-module comprises a thirteenth switching transistor, a fourteenth switching transistor, a fifteenth switching transistor and a third capacitor; wherein, a gate of the thirteenth switching transistor is electrically connected with the fourth node, a first pole of the thirteenth switching transistor is electrically connected with the second clock signal terminal, a second pole of the thirteenth switching transistor is electrically connected with the first pole of the fourteenth switching transistor, a gate of the fourteenth switching transistor is electrically connected with the second clock signal terminal, and a second pole of the fourteenth switching transistor is electrically connected with the first node; a gate of the fifteenth switching transistor is electrically connected with the second node, a first pole of the fifteenth switching transistor is electrically connected with the first power supply terminal, and a second pole of the fifteenth switching transistor is electrically connected with the first node; a first terminal of the third capacitor is electrically connected with the fourth node, and a second terminal of the third capacitor is electrically connected with the second pole of the thirteenth switching transistor;

the second voltage control sub-module comprises a sixteenth switching transistor and a seventeenth switching transistor; a gate of the sixteenth switching transistor is electrically connected with the fourth node, a first pole of the sixteenth switching transistor is electrically connected with the first power supply terminal, a second pole of the sixteenth switching transistor is electrically connected with a first pole of the seventeenth switching transistor, a gate of the seventeenth switching transistor is electrically connected with the second clock signal terminal, and a second pole of the seventeenth switching transistor is electrically connected with the second node.

15. The shift register of claim 14, wherein all of the first switching transistor to the seventeenth switching transistor are P-type transistors.

16. A gate drive circuit, comprising a plurality of cascaded first shift register, wherein the first shift register is the shift register of claim 1, wherein a signal input terminal of the first shift register located in a first stage is connected with a light emitting start signal line, and signal input terminals of the first shift registers located in other stages except the first stage are connected with the light emitting cascade signal output terminals of the first shift registers in a respective preceding stage;

a light emitting control drive signal output terminal of each first shift register is electrically connected with a corresponding light emitting control signal line.

17. A display device comprising a display region and a peripheral region located around the display region, wherein the display region comprises a plurality of pixel units arranged in an array, each row of pixel units is provided with a corresponding light emitting control signal line, and the light emitting control signal line is connected with a gate of a light emitting control transistor in a corresponding pixel unit, and the light emitting control transistor is a P-type transistor;

the peripheral region comprises a first gate drive circuit, and the first gate drive circuit is the gate drive circuit of claim 16.

18. The display device of claim 17, wherein each row of pixel units is further provided with a corresponding first gate line connected to a gate of a data writing transistor in the corresponding pixel units, and a second gate line connected to a gate of a sensing transistor in the corresponding pixel units;

the peripheral region further comprises a second gate drive circuit, the second gate drive circuit comprises a plurality of cascaded second shift registers, the second shift register is configured with a first gate cascade signal output terminal, a second gate cascade signal output terminal and a third gate cascade signal output terminal, the first gate cascade signal output terminal is connected with a corresponding first gate line, the second gate cascade signal output terminal is connected with a corresponding second gate line, and the third gate cascade signal output terminal is the subsequent stage gate cascade signal output terminal in the first shift register.

* * * * *